(12) United States Patent
Wirth et al.

(10) Patent No.: US 12,200,539 B2
(45) Date of Patent: *Jan. 14, 2025

(54) RELIABLE DATA PACKET TRANSMISSION AMONG ENTITIES OF A RADIO ACCESS NETWORK OF A MOBILE COMMUNICATION NETWORK

(71) Applicant: Fraunhofer-Gesellschaft zur Foerderung der angewandten Forschung e. V., Munich (DE)

(72) Inventors: Thomas Wirth, Kleinmachnow (DE); Thomas Schierl, Berlin (DE); Cornelius Hellge, Berlin (DE); Eiko Seidel, Munich (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/444,270

(22) Filed: Feb. 16, 2024

(65) Prior Publication Data

US 2024/0187922 A1 Jun. 6, 2024

Related U.S. Application Data

(63) Continuation of application No. 18/165,893, filed on Feb. 7, 2023, now Pat. No. 11,910,233, which is a
(Continued)

(30) Foreign Application Priority Data

Mar. 23, 2017 (EP) ..................................... 17162655

(51) Int. Cl.
*H04W 72/04* (2023.01)
*H04B 17/309* (2015.01)
(Continued)

(52) U.S. Cl.
CPC .......... *H04W 28/04* (2013.01); *H04B 17/309* (2015.01); *H04L 1/1812* (2013.01);
(Continued)

(58) Field of Classification Search
CPC . H04W 28/04; H04W 28/0268; H04W 28/06; H04W 64/003; H04W 76/27;
(Continued)

(56) References Cited

U.S. PATENT DOCUMENTS

| | | |
|---|---|---|
| 8,605,674 B2 | 12/2013 | Park et al. |
| 2004/0170192 A1 | 9/2004 | Herrmann |

(Continued)

FOREIGN PATENT DOCUMENTS

| | | |
|---|---|---|
| CN | 102594500 A | 7/2012 |
| CN | 103036831 A | 4/2013 |

(Continued)

OTHER PUBLICATIONS

"Packet Duplication in NR", 3GPP Draft; R2-1700423; 3rd Generation Partnership Project (3GPP), Mobile Competence Centre; Spokane, US; 2017F-06921 Sophia-Antipolis Cedex ; France vol. RAN WG2, No. Spokane, USA; Jan. 17, 2017-Jan. 19, 2017 Jan. 17, 2017 (Jan. 17, 2017), XP051211002.

(Continued)

*Primary Examiner* — Mahbubul Bar Chowdhury
(74) *Attorney, Agent, or Firm* — PERKINS COIE LLP; Michael A. Glenn

(57) ABSTRACT

A user equipment for a mobile communication network is provided. The mobile communication network has a radio access network including a plurality of cells and being configured to serve the user equipment within a cell. To receive a data packet from the radio access network, the user equipment is configured to receive a plurality of different versions of the data packet transmitted by the radio access
(Continued)

network to the user equipment in parallel via different physical resources. To provide a data packet to the radio access network, the user equipment is configured to provide a plurality of different versions of the data packet and to transmit the plurality of different versions of the data packet to the radio access network in parallel via different physical resources.

14 Claims, 22 Drawing Sheets

Related U.S. Application Data continuation of application No. 16/579,143, filed on Sep. 23, 2019, now Pat. No. 11,601,845, which is a continuation of application No. PCT/EP2018/056189, filed on Mar. 13, 2018.

(51) Int. Cl.

| | | |
|---|---|---|
| *H04L 1/1812* | (2023.01) | |
| *H04W 28/02* | (2009.01) | |
| *H04W 28/04* | (2009.01) | |
| *H04W 28/06* | (2009.01) | |
| *H04W 64/00* | (2009.01) | |
| *H04W 76/27* | (2018.01) | |
| *H04W 80/02* | (2009.01) | |
| *H04W 80/08* | (2009.01) | |

(52) U.S. Cl.
CPC ....... *H04W 28/0268* (2013.01); *H04W 28/06* (2013.01); *H04W 64/003* (2013.01); *H04W 76/27* (2018.02); *H04W 80/02* (2013.01); *H04W 80/08* (2013.01)

(58) Field of Classification Search
CPC .... H04W 80/02; H04W 80/08; H04B 17/309; H04L 1/1812; H04L 1/1819; H04L 1/1851; H04L 1/1896; H04L 5/0055; H04L 5/0094; H04L 5/0044
See application file for complete search history.

(56) References Cited

U.S. PATENT DOCUMENTS

| | | |
|---|---|---|
| 2009/0070650 A1 | 3/2009 | Bourlas et al. |
| 2010/0157791 A1 | 6/2010 | Casaccia et al. |
| 2011/0041021 A1 | 2/2011 | Khoshnevis et al. |
| 2011/0055652 A1 | 3/2011 | Park |
| 2011/0317637 A1 | 12/2011 | Kim et al. |
| 2012/0069796 A1 | 3/2012 | Casaccia et al. |
| 2012/0076021 A1 | 3/2012 | Sambhwani |
| 2012/0289170 A1 | 11/2012 | Li et al. |
| 2013/0021987 A1 | 1/2013 | Ho et al. |
| 2013/0039202 A1 | 2/2013 | Feuersanger et al. |
| 2013/0343273 A1 | 12/2013 | Barbieri et al. |
| 2014/0192740 A1 | 7/2014 | Ekpenyong et al. |
| 2015/0229444 A1 | 8/2015 | Webb et al. |
| 2018/0049234 A1 | 2/2018 | Lee et al. |
| 2018/0279401 A1 | 9/2018 | Hong et al. |
| 2019/0059127 A1 | 2/2019 | Fan et al. |
| 2019/0222474 A1 | 7/2019 | Wittberg et al. |
| 2019/0245671 A1 | 8/2019 | Loehr et al. |
| 2019/0274117 A1 | 9/2019 | Zhang et al. |
| 2019/0289489 A1 | 9/2019 | Yi et al. |
| 2019/0327641 A1 | 10/2019 | Mok et al. |
| 2019/0357137 A1 | 11/2019 | Shah et al. |
| 2020/0015120 A1 | 1/2020 | Lin et al. |
| 2020/0275302 A1 | 8/2020 | Youn et al. |
| 2021/0112610 A1 | 4/2021 | Xiao et al. |

FOREIGN PATENT DOCUMENTS

| | | |
|---|---|---|
| CN | 105517168 A | 4/2016 |
| JP | 2008515358 A | 5/2008 |
| KR | 20070072905 A | 7/2007 |
| KR | 20120135235 A | 12/2012 |
| KR | 20130054417 A | 5/2013 |
| KR | 20150132176 A | 11/2015 |
| WO | 2006039635 A2 | 4/2006 |
| WO | 2016105978 A1 | 6/2016 |
| WO | 2016148358 A1 | 9/2016 |

OTHER PUBLICATIONS

3GPP TR, "Study on New Radio Access Technology; Radio Access Architecture and Interfaces (Release 14)", 3GPP TR 38.801 V2.0.0 (Mar. 2017); Internet_http://www.3gpp.org; 9, Mar. 2017, 90 pp.

CATT, "Packet Duplication in MAC", 3GPP TSG-RAN WG2 #97, Rs-1700967, Athens, Greece, Feb. 13, 2017, 3 pp.

Ericsson, "Data duplication in lower layers (HARQ)", 3GPP TSG-RAN WG2 #97, Tdoc R2-1702032, Revision of R2-1700833, Feb. 13, 2017, 6 pp.

Ericsson, "Data duplication in lower layers (HARQ)", 3GPP TSG-RAN WG2 Meeting #97 R2-1702032, [online], URL, https://www.3gpp.org/ftp/tsg_ran/WG2_RL2/TSGR2_97/Docs/R2-1702032.zip, Feb. 20, 2017, pp. 1-6.

Huawei, Hisilicon, "Packet duplication for LTE-NR tight interworking", 3GPP TSG-RAN WG2 #97, R2-1701846, Athens, Greece, Feb. 13, 2017, 2 pp.

Huawei, Hisilicon, "Redundancy Schemes below PDCP Layer", 3GPP TSG-RAN2 Meeting #97, R2-1701201, Athens, Greece, Feb. 13, 2017, 4 pp.

Huawei, Hisilicon, "Redundancy Schemes below PDCP Layer", 3GPP TSG-R AN WG2 Meeting #97 R2-1701201, [online], URL, https://www.3gpp.org/ftp/tsg_ran/WG2_RL2/TSGR2_97/Docs/R2-1701201.zip, Feb. 4, 2017, pp. 1-4.

Intel Corporation, "Packet duplication for URLLC within a gNB", 3GPP TSG-RAN WG2 97 meeting, R2-1701720, Athens, Greece, Feb. 13, 2017, 3 pp.

Intel Corporation, "Packet duplication for URLLC within a gNB", 3GPP TSG-RAN WG2 Meeting #97 R2-1701720, [online], URL https://www.3gpp.org/ftp/tsg_ran/WG2_RL2/TSGR2_97/Docs/R2-1701720.zip, Feb. 4, 2017, pp. 1-3.

Interdigital Communications, "Packet Duplication at Pdcp", 3GPP TSG-RAN WG2 Meeting #97, R2-1701186, Athens, Greece, Feb. 13, 2017, 2 pp.

LG Electronics Inc., "Packet duplication in CA", 3GPP TSG-RAN WG2 Meeting #97, R2-1701542, Athens, Greece, Feb. 13, 2017, 3 pp.

Samsung, "Considerations on Packet Duplication for URLLC", 3GPP TSG-RAN WG2 Meeting #97, R2-1701986, Athens, Greece, Feb. 13, 2017, 4 pp.

3) NR tightly integrated in LTE (split at CN)

2) LTE tightly integrated in NR (split at CN)

1) NR tightly integrated in LTE (split at CN)

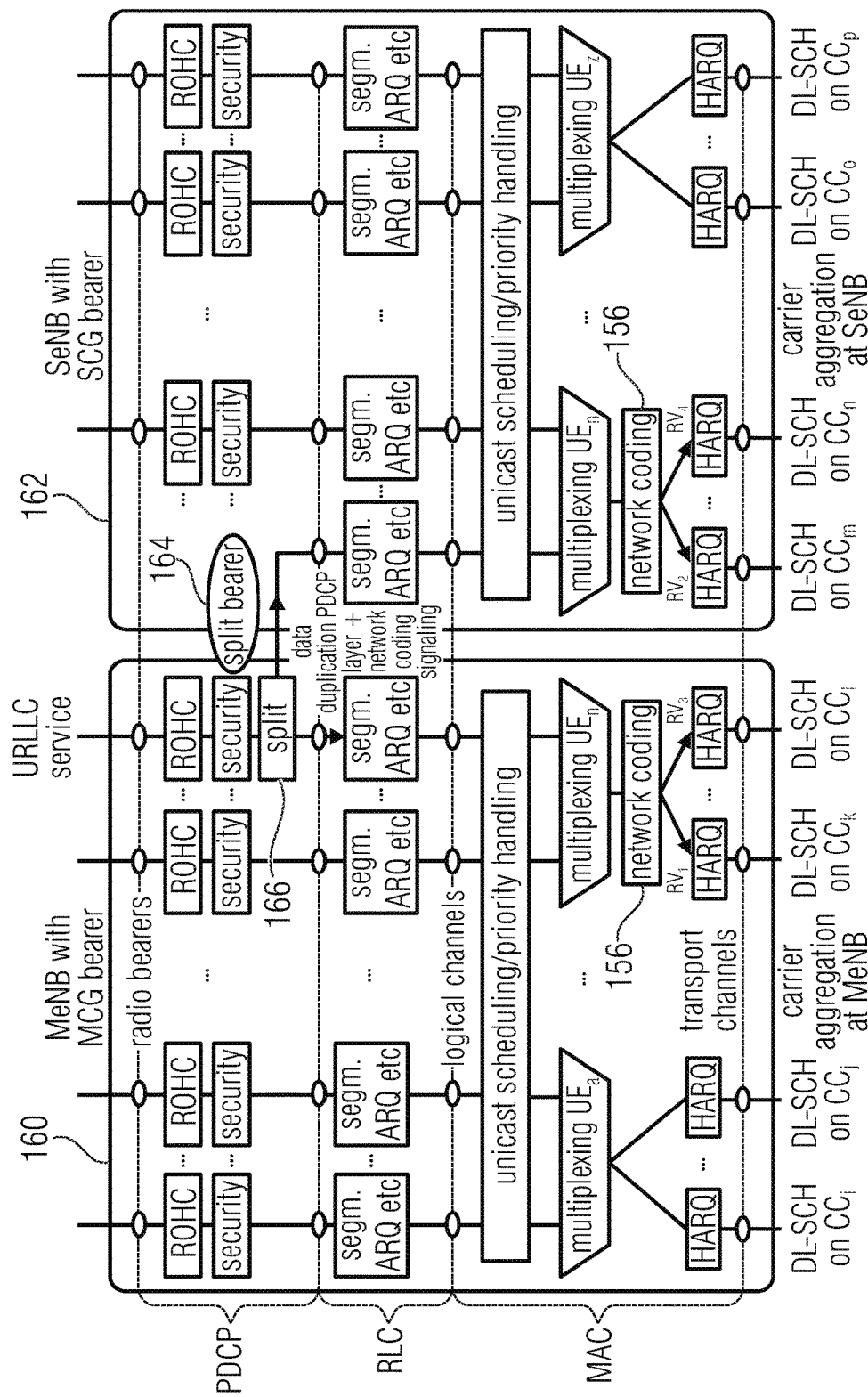

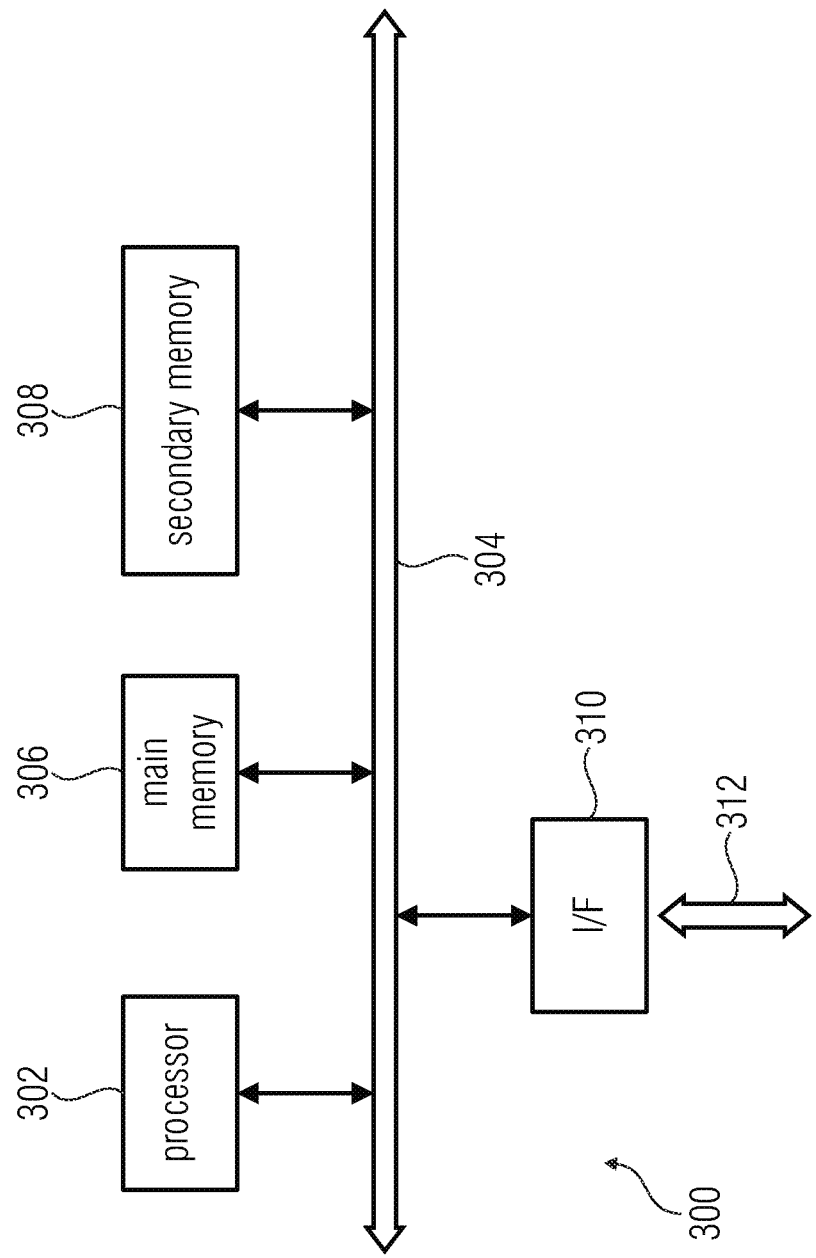

RELIABLE DATA PACKET TRANSMISSION AMONG ENTITIES OF A RADIO ACCESS NETWORK OF A MOBILE COMMUNICATION NETWORK

CROSS-REFERENCES TO RELATED APPLICATIONS

This application is a continuation of copending U.S. patent application Ser. No. 18/165,893, filed Feb. 7, 2023, which in turn is a continuation of U.S. patent application Ser. No. 16/579,143, filed on Sep. 23, 2019, now U.S. Pat. No. 11,601,845, issued May 7, 2023, which is a continuation of International Application No. PCT/EP2018/056189, filed Mar. 13, 2018, which claims priority from European Application No. EP 17162655.9, filed Mar. 23, 2017, which are each incorporated herein in its entirety by this reference thereto.

The present invention relates to the field of mobile communication networks and, more specifically, to a reliable transmission of data packets among different entities of the radio access network of the mobile communication network, for example a reliable data packet communication between base stations and mobile devices or other user equipment (UE).

BACKGROUND OF THE INVENTION

FIG. 1 is a schematic representation of an example of a wireless network 100 including a core network 102 and a radio access network 104. The radio access network 104 may include a plurality of base stations $eNB_1$ to $eNB_5$, each serving a specific area surrounding the base station schematically represented by respective cells $106_1$ to $106_5$. The base stations are provided to serve users within a cell. A user may be a stationary device or a mobile device. Further, the wireless communication system may be accessed by IoT devices which connect to a base station or to a user. IoT devices may include physical devices, vehicles, buildings and other items having embedded therein electronics, software, sensors, actuators, or the like as well as network connectivity that enable these devices to collect and exchange data across an existing network infrastructure. FIG. 1 shows an exemplary view of only five cells, however, the wireless communication system may include more such cells. FIG. 1 shows two users UE1 and UE2, also referred to as user equipment (UE), that are in cell $106_2$ and that are served by base station $eNB_2$. Another user $UE_3$ is shown in cell $106_4$ which is served by base station $eNB_4$. The arrows $108_1$, $108_2$ and $108_3$ schematically represent uplink/downlink connections for transmitting data from a user $UE_1$, $UE_2$ and $UE_3$ to the base stations $eNB_2$, $eNB_4$ or for transmitting data from the base stations $eNB_2$, $eNB_4$ to the users $UE_1$, $UE_2$, $UE_3$. Further, FIG. 1 shows two IoT devices $110_1$ and $110_2$ in cell $106_4$, which may be stationary or mobile devices. The IoT device $110_1$ accesses the wireless communication system via the base station $eNB_4$ to receive and transmit data as schematically represented by arrow $112_1$. The IoT device $110_2$ accesses the wireless communication system via the user $UE_3$ as is schematically represented by arrow $112_2$. The respective base station $eNB_1$ to $eNB_5$ are connected to the core network 102 via respective backhaul links $114_1$ to $114_5$, which are schematically represented in FIG. 1 by the arrows pointing to the "core". The core network 102 may be connected to one or more external networks.

The wireless communication system may be any single-tone or multicarrier system based on frequency-division multiplexing, like the orthogonal frequency-division multiplexing (OFDM) system, the orthogonal frequency-division multiple access (OFDMA) system defined by the LTE standard, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used.

For data transmission a physical resource grid may be used. The physical resource grid may comprise a set of resource elements to which various physical channels and physical signals are mapped. For example, the physical channels may include the physical downlink and uplink shared channels (PDSCH, PUSCH) carrying user specific data, also referred to as downlink and uplink payload data, the physical broadcast channel (PBCH) carrying for example a master information block (MIB) and a system information block (SIB), the physical downlink control channel (PDCCH) carrying for example the downlink control information (DCI), etc. For the uplink, the physical channels may further include the physical random access channel (PRACH or RACH) used by UEs for accessing the network once a UE synchronized and obtained the MIB and SIB. The physical signals may comprise reference signals (RS), synchronization signals and the like. The resource grid may comprise a frame having a certain duration, like 10 milliseconds, in the time domain and having a given bandwidth in the frequency domain. The frame may have a certain number of subframes of a predefined length, e.g., 2 subframes with a length of 1 millisecond. Each subframe may include two slots of 6 or 7 OFDM symbols depending on the cyclic prefix (CP) length. The PDCCH may be defined by a pre-defined number of OFDM symbols per slot. For example, the resource elements of the first three symbols may be mapped to the PDCCH, i.e., the size of the PDCCH is limited. Consequently, the number also limits how many DCIs may be carried in one subframe. This may, in turn, limit the number of UEs which may receive an allocation for the subframe when using dynamic scheduling.

In the wireless communication network as shown in FIG. 1 the radio access network 104 may be a heterogeneous network including a network of primary cells, each including a primary base station, also referred to as a macro base station. Further, a plurality of secondary base stations, also referred to as small cell base stations, may be provided for each of the macro cells. FIG. 2 is a schematic representation of a cell, like cell $106_1$ in FIG. 1, having two distinct overlaid networks, the networks comprising a macro cell network including the macro cell $106_1$, and a small cell network. Although FIG. 2 represents only a single macro cell, it is noted that one or more of the other cells in FIG. 1 may also use the overlaid networks. The small cell network comprises a plurality of small cell base stations $SeNB_1$ to $SeNB_5$ each operating within a respective area $120_1$ to $120_5$, also referring as the coverage area of the small cell. The small cell base stations $SeNB_1$ to $SeNB_5$ may be controlled by the macro cell base station $MeNB_1$ to which the respective small cell base stations $SeNB_1$ to $SeNB_5$ are connected via respective backhaul links $122_1$ to $122_5$. Rather than connecting the small cell base stations via the backhaul links to the macro cell base station, one or more of the small cell base stations may be coupled to the core network via respective backhaul links. FIG. 2 further shows a user equipment UE being served by the macro cell base station $MeNB_1$ as indicated by arrow 124₁ and by the small cell base station SeNB₁, as indicated schematically by the arrow 124₂.

In mobile communication networks, for example in networks like those described above with reference to FIG. 1 and FIG. 2, a UE may communicate with the radio access network via multiple transmission links. For example, the UE may support carrier aggregation (CA) which allows adding flexibility to the connection to the UE in the resource allocation and load balancing between the multiple carriers used. CA has a flat hierarchy including a primary component carrier and a number of secondary component carriers. The primary and secondary component carriers may be provided by the same or different entities in the radio access network, for example by a single base station providing different component carriers or by a plurality of base stations, like in the scenario depicted with reference to FIG. 2.

FIG. 3 shows a schematic representation for carrier aggregation in the cell 106₁ of the system of FIG. 1. Within the cell 106₁ covered by the base station eNB₁, a first UE₁ and a second UE₂ are present, of which the first UE₁ supports carrier aggregation, i.e., communicates with the base station eNB₁ using a primary cell (PC) component carrier and a secondary cell (SC) component carrier. On the other hand, the second UE₂ does not support carrier aggregation and communicates with the base station eNB₁ using only a single carrier C. The primary cell component carriers may be provided, as mentioned above, by a primary cell operating in a licensed spectrum and acting as a typical base station as in a non-CA case. The secondary component carriers may be provided by one or more secondary cells (see FIG. 2 above) and may be added/removed as needed so as to help to boost capacity in the cell 106₁. Two or more component carriers may be provided, dependent on the communication standard implemented by the mobile communication system. Carrier aggregation reuses an existing protocol structure so that there are no modifications to the radio link control (RLC) layer and to the packet data convergent protocol (PDCP) layer of the radio access network protocol architecture. For implementing carrier aggregation only modifications of the physical layer and the MAC layer are needed. The MAC layer supports the multiplexing of the multiple component carriers. Each component carrier may operate independently, for example an independent link adaption, an independent MIMO adaption, independent HARQ retransmissions and the like may be provided. The component carriers may support the channel bandwidth defined by the respective communication standard implemented in the communication system, for example in the LTE the bandwidth may be 1.4 MHZ, 3 MHZ, 5 MHZ, 10 MHZ, 15 MHz or 20 MHz, and in New Radio (NR), the minimum bandwidth for initial access for a frequency range up to 6 GHz can be either 5 or 10 MHz, for a higher frequency range from 6 GHz to 52.6 GHz, the minimum carrier bandwidth can either be 40 or 80 MHz and is frequency band dependent.

The UE may communicate with the RAN of the communication network using dual connectivity which may involve multiple transmission links. A UE is simultaneously connected to two independent base station sites and the respective base stations may implement independent schedulers which allocate resources to the UE. FIG. 4 shows a schematic representation for implementing dual connectivity in a network configuration as described with reference to FIG. 2. The primary cell 106₁ having the primary base station MeNB₁ is depicted as well as one of the secondary base stations SeNB₁ having the coverage area 120₁. A UE is within the coverage area 120₁ and communicates with the primary and secondary base stations, as is indicated by the respective arrows. The primary base station may communicate with the UE using a first frequency F1, and the secondary base station may communicate with the UE using a second frequency F2. The small cell 120₁ may be switched on/off dynamically, for example to increase per user throughput in case of an unequal cell load. The connection between the UE and the primary cell base station may be maintained all the time to provide for a control plane, for example for signaling control messages to the UE. The primary cell base station is also referred to as the master or macro base station. The primary and secondary base stations are connected with each other by the backhaul link 122₁ which may be an X2-like interface.

Each of the base stations depicted in FIG. 4 may itself operate using carrier aggregation as described above with reference to FIG. 3 on top of dual connectivity. The first link is referred to as the master cell group, while the other link(s) is/are referred to as the secondary cell group. FIG. 5 schematically represents the combination of carrier aggregation with dual connectivity and, in the same way as described above with reference to FIG. 3, the UE communicates with the master eNB using primary and secondary carriers and also communicates with the secondary eNB using primary and secondary carriers. In case more than two links are involved, reference is made to multi connectivity (rather than dual connectivity).

Other examples for serving a UE by multiple transmission links may use a plurality of base stations using different radio access technologies (RATs). For example, base stations operating in accordance with LTE and 5G/NR (new radio) may be used for implementing the respective base stations. This is also referred to as inter-RAT or multi-RAT (dual) connectivity. FIG. 6A-C shows schematic representations of examples for inter-RAT connectivity using LTE-base stations and 5G/NR base stations. In FIG. 6(A) and in FIG. 6(B) the primary base stations are LTE base stations and the secondary base stations are 5G/NR base stations. In FIG. 6(A) the core network is defined by LTE, whereas in FIG. 6(B) the core network is defined by 5G/NR. In FIG. 6(C) a network scenario is depicted in which the primary base station is a 5G/NR base station coupled to a 5G/NR core network, and the secondary base station is a LTE base station. Rather than providing one or more base stations using different mobile communication standards, instead or in addition other access points may be combined, for example, access points in accordance with IEEE 802.11, IEEE 802.11p DSRC (Dedicated Short Range Communication) or other technologies such as Bluetooth or WiFi variants.

In the scenario described above with reference to FIG. 1 to FIG. 6A-C, data packets to be communicated between respective entities of the radio access network, like the base stations and a mobile user equipment, may include user data or control data. However, the communication may not be reliable enough for specific services, for example due to the varying channel quality between the UE and the base station. Conventionally, this problem is addressed by implementing a retransmission process, like a HARQ (hybrid automatic repeat request) process, so that one or more of the entities in the communication at which a data packet was not received/successfully decoded, e.g., due to a varying channel quality, may request a retransmission. The transmitting or sending entity may provide for a retransmission of the data packet, once the HARQ messaging was completed. This allows for a reliable transmission of the data packet, but additional time is needed for the retransmission. Further, the number of retransmission is typically limited, e.g. in LTE there are eight asynchronous HARQ processes for a downlink (DL) FDD. This limits the performance with respect to reliability and low latency.

SUMMARY

An embodiment may have a user equipment (UE) for a mobile communication network, the mobile communication network having a radio access network including a plurality of cells and being configured to serve the user equipment within a cell, wherein, to receive a data packet from the radio access network, the user equipment is configured to receive a plurality of different versions of the data packet transmitted by the radio access network to the user equipment in parallel via different physical resources.

Another embodiment may have a user equipment for a mobile communication network, the mobile communication network having a radio access network including a plurality of cells and being configured to serve the user equipment within a cell, wherein, to provide a data packet to the radio access network, the user equipment is configured to provide a plurality of different versions of the data packet and to transmit the plurality of different versions of the data packet to the radio access network in parallel via different physical resources.

According to another embodiment, a mobile communication network may have: a radio access network having a plurality of cells, the radio access network being configured to serve a user equipment within a cell, wherein, to provide a data packet to the user equipment, the radio access network is configured to provide a plurality of different versions of the data packet and to transmit the plurality of different versions of the data packet to the user equipment in parallel via different physical resources.

According to another embodiment, a mobile communication network may have: a radio access network having a plurality of cells, the radio access network being configured to serve a user equipment within a cell, wherein, to provide a data packet to the radio access network, the user equipment is configured to provide a plurality of different versions of the data packet and to transmit the plurality of different versions of the data packet to the radio access network in parallel via different physical resources.

According to another embodiment, a method may have the step of: receiving at a user equipment for a mobile communication network a data packet, the mobile communication network having a radio access network including a plurality of cells and being configured to serve the user equipment within a cell, wherein receiving the data packet from the radio access network comprises receiving a plurality of different versions of the data packet transmitted by the radio access network to the user equipment in parallel via different physical resources.

According to another embodiment, a method may have the step of: transmitting by a user equipment for a mobile communication network a data packet, the mobile communication network having a radio access network including a plurality of cells and being configured to serve the user equipment within a cell, wherein transmitting the data packet to the radio access network comprises providing a plurality of different versions of the data packet and transmitting the plurality of different versions of the data packet to the radio access network in parallel via different physical resources.

According to another embodiment, a method for transmitting a data packet in a mobile communication network, the mobile communication network having a radio access network including a plurality of cells and serving a user equipment within a cell, may have the steps of: providing, by the radio access network, a plurality of different versions of the data packet, and transmitting the plurality of different versions of the data packet to the user equipment in parallel via different physical resources.

According to another embodiment, a method for transmitting a data packet in a mobile communication network, the mobile communication network having a radio access network including a plurality of cells and serving a user equipment within a cell, may have the steps of: providing, by the user equipment a plurality of different versions of the data packet; and transmitting the plurality of different versions of the data packet to the radio access network in parallel via different physical resources.

Another embodiment may have a non-transitory computer program product comprising a computer readable medium storing instructions which, when executed on a computer, carry out the methods as mentioned above.

In accordance with the inventive approach, a user equipment for a mobile communication network is provided. The mobile communication network has a radio access network including a plurality of cells and being configured to serve the user equipment within a cell. In accordance with embodiments, to receive a data packet from the radio access network, the user equipment is configured to receive a plurality of different versions of the data packet transmitted by the radio access network to the user equipment in parallel via different physical resources. In accordance with other embodiments, to provide a data packet to the radio access network, the user equipment is configured to provide a plurality of different versions of the data packet and to transmit the plurality of different versions of the data packet to the radio access network in parallel via different physical resources.

The different versions of the data packet may comprise one or more of (i) the data packet itself, or (ii) one or more certain redundancy versions of the data packet, or (iii) one or more erasure correction codes for the data packet, or (iv) one or more duplicates of the data packet, or (v) a combination of any of (i) to (iv). The one or more certain redundancy versions may provide for an incremental redundancy at a receiver. In accordance with embodiments, the different versions of the data packet may be obtained by providing:
- error correction codes, e.g. a redundancy version of the implemented physical layer code,
- a duplication
- erasure correction codes such as Raptor, LDPC, LT, or network codes implemented on higher layers than the physical layer.

In accordance with embodiments, transmitting the plurality of different versions of the data packet in parallel may comprise one or more of:
- transmitting the plurality of different versions of the data packet in a coordinated manner, or
- transmitting the plurality of different versions of the data packet at substantially the same time, or
- transmitting the plurality of different versions of the data packet within a predefined time window, or
- transmitting a first version of the data packet and automatically transmitting a second version of the data packet when transmitting the first version, or
- transmitting a first version of the data packet and transmitting a second version of the data packet independent of any request from a receiver following the transmission of the first version.

Transmitting the plurality of different versions of the data packet in a coordinated manner may comprise transmitting the plurality of different versions of the data packet in a time coordinated manner, and/or transmitting the plurality of different versions of the data packet together with control information identifying the plurality of different versions of the data packet. The control information may comprise a sequence number or a packet identity for each of the plurality of different versions of the data packet. Transmitting the plurality of different versions of the data packet in a coordinated manner may comprises sending the plurality of different versions of the data packet on the different physical resources at a certain time or within a certain time window.

In accordance with embodiments of the inventive approach, the different versions of the data packet are transmitted via separate transmission links or separate physical resources between the RAN and the UE. The respective transmissions may be initiated upon deciding that the data packet is to be transmitted, i.e., rather than waiting for a request for a retransmission in case of a failed transmission of the data packet, in accordance with the inventive approach, different versions of the data packet are transmitted at the same time or substantially simultaneously via different physical resources between the UE and the RAN. The different versions of the data packet are available at the receiver at a certain time or within a time window during which the data is expected. An advantage of the approach is that re-transmissions may not be necessary or the number of retransmissions may be significantly reduced. The inventive approach allows the data packet to be reliably transmitted without an increase in the time until the packet is actually available at the receiver for further processing.

In accordance with embodiments of the present invention, the transmission of the different versions of the data packet may use more than two separate transmission links or separate physical resources.

The inventive approach, in accordance with embodiments, may provide for spatial or frequency diversity time diversity by providing transmissions of the different versions of the data packet over multiple signals or for time diversity by bundling multiple time units, for example slots or subframes. Other than conventional approaches, which provide for a reliable transmission on the basis of retransmissions, like HARQ, the inventive approach avoids the latency introduced by such retransmission schemes. In accordance with other embodiments, a spatial diversity may be provided by transmitting the packets via different beams using different antennas or different base station sites. The use of different base stations sites may provide for the largest spatial diversity. Also a frequency diversity may be achieved by transmitting the different versions of the data packet on different carriers in the frequency domain.

In accordance with embodiments, ultra-reliable low latency communication (URLLC) services may trigger a data packet transmission in accordance with the inventive approach as, for such services, the reliable transmission is paramount as well as the low latency. A URLLC service may be used for a V2V (vehicle-to-vehicle) communication or a V2N (vehicle-to-network) communication. Such services may use a 1 ms end-to-end radio link latency and a guaranteed minimum reliability of 99.999%. Such quality of service (QOS) requirements are achieved in accordance with embodiments of the present invention by transmitting different versions of the data packet to a receiver, like a UE in a downlink connection or a base station in an uplink connection of a mobile communication network.

The inventive approach providing different versions of a data packet to the receiver may also be referred to as packet redundancy/duplication approach, as packet redundancy/duplication process, or simply as packet redundancy/duplication.

In accordance with the inventive packet redundancy/duplication approach the performance of services requiring a reliable transmission of data packets without increase in latency, like URLLC services, may be improved. The processing of the data packets may be configured in certain layers of the radio access network protocol stack, for example in the PDCP layer when using dual connectivity or multi connectivity, or in the MAC layer when implementing carrier aggregation. Thus, in accordance with embodiments, packet redundancy/duplication is performed at the PDCP or at the MAC layer of the RAN protocol architecture so as to increase the redundancy in the communication system which allows for an increase in the robustness of the communication system at a reduction of the latency. This may allow, for example, ultra-low latencies of 1 ms or less on a packet level, wherein both the increase in robustness and the reduction in latency may be triggered responsive to system requirements or to a key performance indicator for a certain service having ultra-reliable low latency communication (URLLC) constraints.

In accordance with embodiments, a "duplicated packet" may comprise a packet containing redundant information but having a smaller or larger packet size than the original packet. In accordance with yet other embodiments, the duplicated packet may be an exact copy of the same packet with identical content and using the same or a different encoding scheme, or a packet of the same or different size of the original packet containing redundant information with respect to the initial packet.

In accordance with embodiments, the inventive packet redundancy/duplication may be operated in the downlink direction, in the uplink direction or in both directions. Further embodiments concern the packet redundancy/duplication in a side-link direction, e.g. where a side-link refers to a communication link between two user equipments (UEs). Further, the inventive packet redundancy/duplication approach may be applied both in FDD and TDD as well as in full-duplex or half-duplex systems. For example, also combinations are valid, where a base station operates in full-duplex mode, and a UE communicates in half-duplex mode.

In accordance with embodiments, the control signaling in the uplink direction may be modified, as the uplink configuration will be done at the transmitter site, for example at the base station, and will be signaled from the base station in the downlink direction.

In accordance with embodiments, the UE may autonomously decide whether the inventive packet redundancy/duplication approach is to be applied or not, thereby avoiding signaling overhead.

In accordance with embodiments, a pre-determined, common control channel is provided, for example a single control channel for a multi-link configuration on a MCS level, or a single control channel for a common link configuration using the same MCS levels, or a single control channel using a configuration template defining specific configuration parameters dependent on frequency characteristics to be used. Alternatively, a set of control channels may be used.

In accordance with embodiments, the configuration may be signaled using the radio resource control (RRC) protocol which, for example, may indicate a number of different versions of the data packet to be provided, a number of times a packet shall be duplicated or how many redundant versions of a packet shall be provided, may indicate a number of transmission links to be used, may indicate whether the inventive packet redundancy/duplication is enabled or not per bearer or per logical channel, may indicate what carrier frequencies are to be used, and/or may indicate whether carrier aggregation and/or dual- or multi-connectivity (intra-RAT or inter-RAT or multi-RAT) is applied.

In accordance with embodiments, the configuration may be signaled using a downlink control information (DCI) message that may be transmitted over the PDCCH or PUCCH and which may signal the frequency resources used, the MCS level, the channel coding and the like for the transmission of the different versions of the data packet.

In accordance with other embodiments, the configuration may be signaled upon QoS bearer setup or by the O&M (operations and maintenance system) of the network so as to define a new packet redundancy/duplication service bearer in the downlink/uplink, only in the downlink or only in the uplink.

In accordance with the inventive packet redundancy/ duplication approach, the transmission of the different versions of the data packet over different and separate physical resources is coordinated in time. The packet redundancy/ duplication may be time windowed so as to adapt to the different timing constraints, like different sub-carrier spacing (SCS), associated with several distributed transmission links. The timing window for a service may be signaled, for example a synchronization. In accordance with other embodiments, one or more time diversity schemes, like staggering in time, may be signaled.

In accordance with embodiments, a novel HARQ processing may be applied in case, despite the inventive packet redundancy/duplication approach, a data packet is not received/decodable at the receiver. The HARQ process may be performed only on a primary or another predefined carrier or it may be performed with regard to the packet stream which has been decoded faster. The HARQ process may also be applied on all physical links in parallel to achieve maximum robustness In accordance with further embodiments, the HARQ retransmission process, if needed, may be implemented such that, when considering the originally transmitted versions of the packet, not the same versions thereof are retransmitted. Rather, other redundancy versions may be transmitted in the retransmission, for example for implementing an incremental redundancy HARQ process. In accordance with other embodiments, a chase combining HARQ process may be applied to cause a retransmission of the same/original information. Also any combination of chase combining and incremental redundancy may be allowed, e.g. chase combining over multiple links via packet duplication and incremental redundancy in the time domain via parallel packet redundancy transmission.

The inventive packet redundancy/duplication approach, in general, refers to data packets that may include user data or control data. Thus, in accordance with embodiments, the inventive packet redundancy/duplication approach may be performed on different logical channels, for example on the control channel or on the data channel, on the RRC signaling channels, or on combinations thereof.

In accordance with embodiments, the inventive packet redundancy/duplication may be leverage all kinds of existing diversity techniques, like frequency diversity, spatial (beam) diversity, code diversity as in CDMA- or MUST-based systems or in networks supporting non-orthogonal transmission schemes such as multiuser superposition transmission (MUST), a combination of site (different location of base stations) and frequency diversity, a time diversity, or combinations thereof.

In accordance with advantageous embodiments, the inventive packet redundancy/duplication approach may be implemented using carrier aggregation including a packet redundancy/duplication on the MAC level of the RAN protocol stack. In accordance with other embodiments, dual connectivity may be implemented with a packet redundancy/ duplication on the PDCP layer or on both the PDCP layer and the MAC layer if one or more of the base stations also applies carrier aggregation. Dual connectivity may include entities using the same radio access technology which is referred to as single RAT connectivity implementing, for example, only LTE entities, only 5G/NR entities or the like. In accordance with other embodiments, different radio access technologies may be used for the different entities which is referred to as multi-RAT conductivity combining, e.g., entities in accordance with 5G/NR and LTE or any combination of known and future standards.

In accordance with other embodiments, the inventive packet redundancy/duplication approach may be implemented using a MBSFN (multi-broadcast single frequency network), in which the packet redundancy/duplication is performed on the MAC layer.

In accordance with embodiments, the inventive packet redundancy/duplication approach may be implemented by relaying, for example by providing a first link via a base station or a small cell base station, and a second link via a relay mode, for example a UE or a further relay station which has a lower path loss to the target UE. The target UE may be, for example, an IoT device or a wearable device. In the relaying approach, the inventive packet redundancy/ duplication is implemented in the physical layer, the MAC layer or the PDCP layer. The UE which forms the relay mode may operate in accordance with further enhanced device-to-device (FeD2D) communications.

In accordance with other embodiments, the inventive packet redundancy/duplication approach may be implemented using a sidelink on which a first UE forwards data directly using the duplicated transmission links over several frequency bands or beams to another UE, the target UE, which is within the coverage area of the UE.

In accordance with other embodiments, a UE autonomous mode may be provided, in which the UE decides whether the inventive packet redundancy/duplication approach is to be used or not, advantageously based on conditions signaled by the base station.

In accordance with further aspects of the present invention provides a mobile communication network including a radio access network (RAN) having a plurality of cells, the radio access network (RAN) being configured to serve a user equipment (UE) within a cell. In accordance with embodiments, to provide a data packet to the user equipment (UE), the radio access network (RAN) is configured to provide a plurality of different versions of the data packet and to transmit the plurality of different versions of the data packet to the user equipment (UE) in parallel via different physical resources. In accordance with other embodiments, to provide a data packet to the radio access network (RAN), the user equipment (UE) is configured to provide a plurality of different versions of the data packet and to transmit the plurality of different versions of the data packet to the radio access network (RAN) in parallel via different physical resources.

In accordance with further aspects of the present invention provides a method comprising receiving at a user equipment (UE) for a mobile communication network a data packet, the mobile communication network having a radio access network (RAN) including a plurality of cells and being configured to serve the user equipment (UE) within a cell, wherein receiving the data packet from the radio access network (RAN) comprises receiving a plurality of different versions of the data packet transmitted by the radio access network (RAN) to the user equipment (UE) in parallel via different physical resources.

In accordance with further aspects of the present invention provides a method comprising transmitting by a user equipment (UE) for a mobile communication network a data packet, the mobile communication network having a radio access network (RAN) including a plurality of cells and being configured to serve the user equipment (UE) within a cell, wherein transmitting the data packet to the radio access network (RAN) comprises providing a plurality of different versions of the data packet and transmitting the plurality of different versions of the data packet to the radio access network (RAN) in parallel via different physical resources.

In accordance with further aspects of the present invention provides a method for transmitting a data packet in a mobile communication network, the mobile communication network having a radio access network (RAN) including a plurality of cells and serving a user equipment (UE) within a cell, the method comprising providing, by the radio access network (RAN), a plurality of different versions of the data packet, and transmitting the plurality of different versions of the data packet to the user equipment (UE) in parallel via different physical resources.

In accordance with further aspects of the present invention provides a method for transmitting a data packet in a mobile communication network, the mobile communication network having a radio access network (RAN) including a plurality of cells and serving a user equipment (UE) within a cell, the method comprising providing, by the user equipment (UE) a plurality of different versions of the data packet; and transmitting the plurality of different versions of the data packet to the radio access network (RAN) in parallel via different physical resources.

In accordance with further aspects of the present invention provides a non-transitory computer program product comprising computer readable medium storing instructions which, when executed on a computer, carry out the inventive methods.

BRIEF DESCRIPTION OF THE DRAWINGS

Embodiments of the present invention will be detailed subsequently referring to the appended drawings, in which:

FIGS. 20A-B show a physical layer processing chain, wherein FIG. 20A shows single processing chain to be done in parallel for each data transmission, and FIG. 20B shows single processing chain to be done for shared processing chain for multiple data transmission in accordance with embodiments of the present invention;

FIG. 24A shows an embodiment of a LTE downlink protocol stack for the implementation of the inventive packet redundancy/duplication approach using dual connectivity wherein the inventive approach is implemented by network coding signaled over the MAC layer;

FIGS. 29A-B schematically show a transmissions between two UEs, wherein FIG. 29A shows that the transmission between the two UEs is controlled by a base station scheduler, and FIG. 29B shows that the transmission between the two UEs is controlled autonomously by the UE;

FIGS. 30A-B schematically show an embodiment of the present invention for implementing the packet redundancy/duplication transmissions directly between two UEs, wherein FIG. 30A shows that the transmission between the two UEs is controlled by a base station scheduler, and FIG. 30B shows that the transmission between the two UEs is controlled autonomously by the UE; and FIG. 31 illustrates an example of a computer system on which units or modules as well as the steps of the methods described in accordance with the inventive approach may execute.

DETAILED DESCRIPTION OF THE INVENTION

Figure 1:
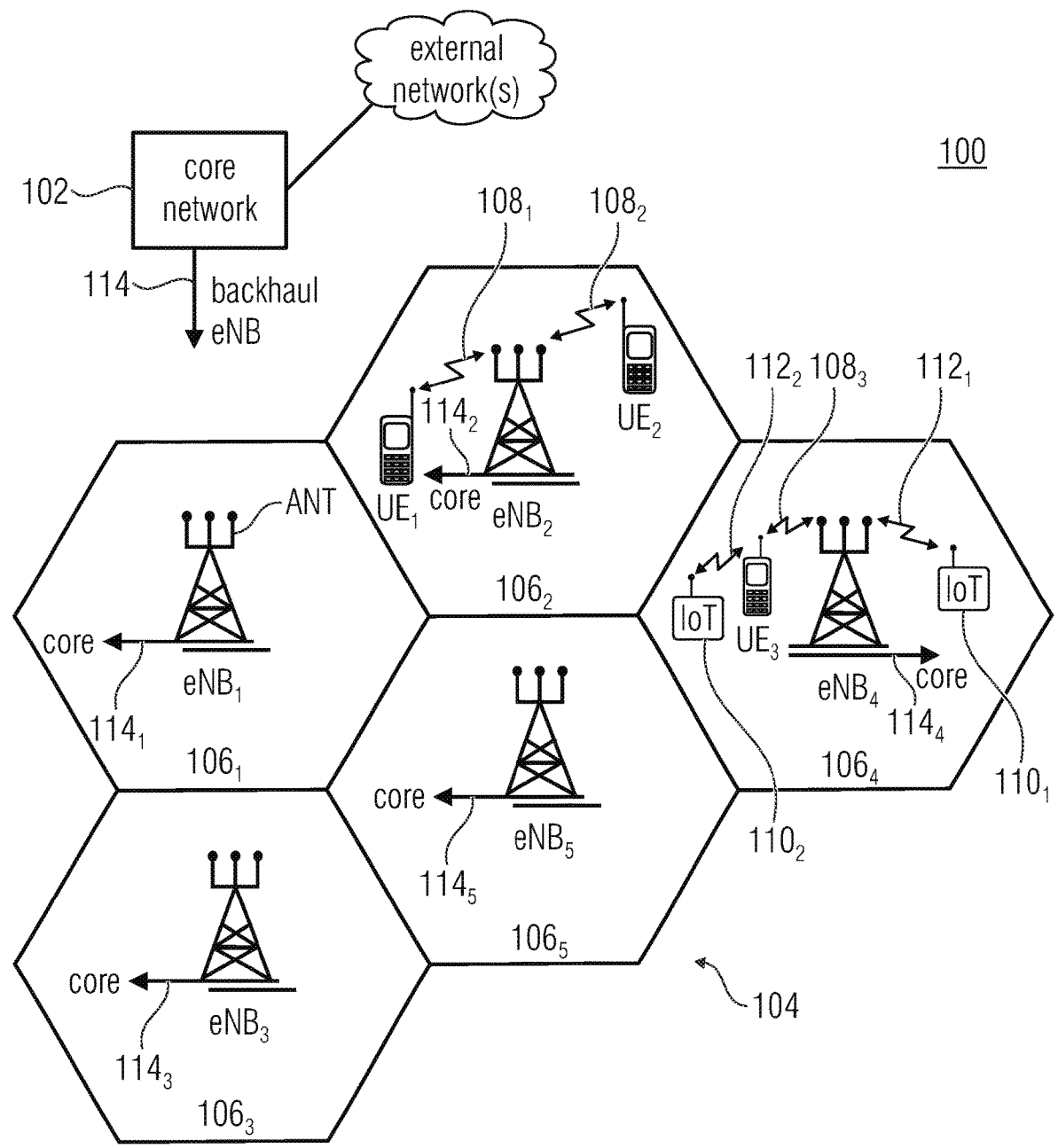
FIG. 1 shows a schematic representation of an example of a wireless network including a core network and a radio access network.

In the following, advantageous embodiments of the present invention are described in further detail with reference to the enclosed drawings in which elements having the same or similar function are referenced by the same reference signs. The inventive packet redundancy/duplication approach will be described in further detail with reference to a plurality of embodiments. In the following description, in general, reference will be made to the transmission of two or three versions of the data packet over respective physical resources which are different from each other, however, the principle underlying the present invention may be extended to any number of physical resources.

Packet Redundancy/Duplication

In accordance with embodiments a packet redundancy/duplication approach is implemented using different physical resources by adding diversity in frequency, time and/or space, thereby providing an increased reliability while keeping the latency low. The actual packet redundancy/duplication may be performed at the MAC layer and/or at the PDCP layer depending on the deployment scenario, for example dependent on whether single site carrier aggregation or multi-site dual connectivity is applied.

In case of a redundancy/duplication at the PDCP layer, there may be multiple entities of the RLC layer, the MAC layer and the PHY layer. In case of implementing the inventive packet redundancy/duplication approach at the MAC layer, there may be multiple PHY entities. At the PDCP layer and/or at MAC layer there may be a function that decides about enabling the inventive packet redundancy/duplication approach. The RRC layer may configure all layers of the protocol stack. At the base station site the RRC layer may configure the lower layer directly, and for the UE configuration, the base station RRC layer may send the RRC reconfiguration messages to inform the UE RRC layer. The configuration may be a static configuration for a certain data radio bearer to apply packet redundancy/duplication for all packets received, for example, for a certain service. In accordance with other embodiments, an adaptive application may be applied so that there will be packet redundancy/duplication approach decisions made within the layer and this function may turn on/off the inventive packet redundancy/duplication approach or may decide about the number and details of the physical resources to be used for the inventive packet redundancy/duplication approach.

Once a decision has been made and a transmission is ongoing, the different versions of the data packet are send via multiple links, for example the actual data packet may be sent over a first transmission link, and one or more redundant versions thereof or one or more duplications of the data packet may be sent over one or more further transmission links. In accordance with other embodiments, different redundant versions of the data packet may be sent over the first transmission link and the one or more further transmission links. For coordinating the transmissions via the multiple links in time, respective side information, also be referred to as coordinated control information or primitives, is passed to the lower layer. The side information may impact the data transmission on a shared channel. The side information may be transmitted on a control channel, like the PDCCH/PUCCH control channel.

The different versions of the data packet may be send within a certain time window, with similar scheduling control information and the like. The time window may be signaled explicitly, for example one or multiple mini-slots, slots or sub-frames may signaled, or it may be derived explicitly, for example on the basis of a maximum scheduling time, a discard timer, a time-to-transmit timer. A slot may be defined by a group of OFDM symbols, e.g. 7 or 14 OFDM symbols for the same subcarrier spacing, e.g. 15 kHz in LTE and up to 60 KHz in New Radio (NR). Slot aggregation may be supported, i.e., data transmission may be scheduled to span one or multiple slots. LTE supports shorter slot length for URLLC via short transmission time intervals (sTTI), and NR supports URLLC services via mini-slots. For mini-slots for systems with carrier frequencies greater than 6 GHZ, mini-slots with length of 1 OFDM symbol are supported. For all other systems, a length from 2 to slot length −1 may be supported, e.g. for URLLC at least 2 OFDM symbols are supported with a target slot length of at least 0.5 ms or 1 ms. The MAC layer may indicate the packet redundancy/duplication and/or the coordinated control information to the physical layer by control information, thereby enabling the physical layer to a similar processing at the transmitter site and at the receiver site.

Figure 7:
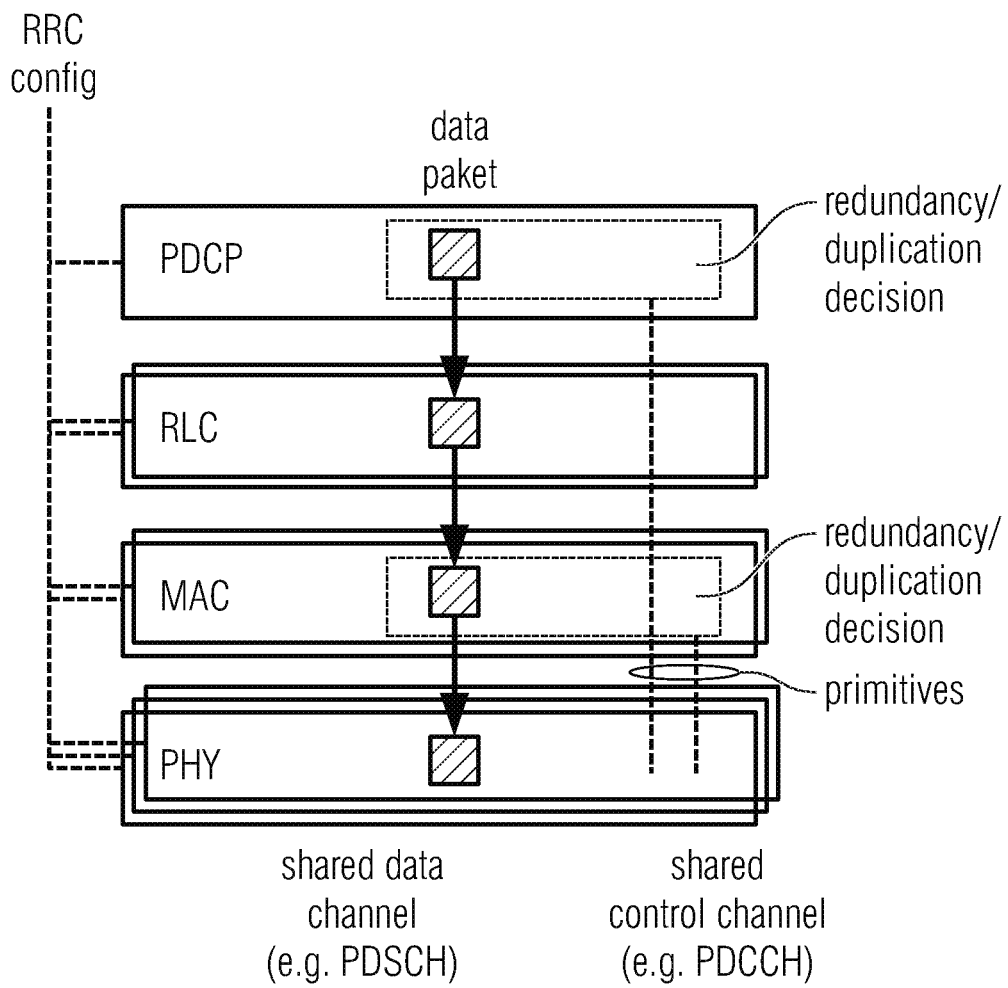
FIG. 7 represents embodiments for operating a protocol stack in accordance with the inventive packet redundancy/duplication approach.

FIG. 7 represents the above summarized possibilities for operating a protocol stack in accordance with the inventive packet redundancy/duplication approach. The protocol stack includes the PDCP layer, the RLC layer, the MAC layer and the PHY layer. The respective layers are configured by higher layers, e.g., in accordance with the RRC configuration message, and data packets to be transmitted are received at the protocol stack and are passed from the PDCP layer to the PHY layer. A redundancy/duplication decision may take place at the PDCP layer in case of implementing dual connectivity, at the MAC layer in case of implementing carrier aggregation, and both at the PDCP layer and the MAC layer when implementing dual connectivity combined with carrier aggregation. As indicated in FIG. 7, the different versions of the data packet are transmitted via the shared data channel, for example the PDSCH, while the control information, for example in the form of primitives, is transmitted via the shared control channel, like the PDCCH.

In accordance with the present invention, the different physical resources may refer to one or more of:
different frequency resources, or
different physical resource blocks (PRBs) on different carriers (carrier aggregation), or
different physical resource blocks (PRBs) on different physical links (dual connectivity), or
different physical resource blocks (PRBs) on different resource pools for direct communication, or
different physical resource blocks (PRBs) on different radio access technologies (RATs) (Inter-RAT connectivity), or
different antennas or beams (transmit diversity) or advanced beamforming techniques.

Different radio access techniques may comprise LTE and 5G/NR. They may include special features within these technologies, like LTE V2X or enhanced V2X (eV2X) of 5G/NR. Furthermore, inter-RAT connectivity may include technologies from other standards, such as technologies in accordance with IEEE 802.11, IEEE 802.11p DSRC or other technologies such as Bluetooth or WiFi variants.

In accordance with embodiments, the RLC layer (see FIG. 7) may operate in an unacknowledged mode to avoid retransmissions and achieve certain latency requirements. The unacknowledged mode implies that the ARQ is turned off, as well as the HARQ retransmissions at the MAC layer. Thus, in accordance with embodiments when implementing URLLC services, the HARQ mechanism may be configured for such URLLC requirements and may be configurable dependent on the service to be implemented. For example, the HARQ may be switched off or may operate with a reduced number of retransmissions, and the MAC layer may operate without multiplexing multiple logic channels. The packets subjected to redundancy/duplication may be limited to the specific services only, like URLLC services, so as to avoid a waste of resources. In accordance with embodiments, the receiving PDCP entity may provide for a buffering of the packets to be transmitted, and may remove those packets which have been received successfully via the different physical resources.

It is noted that the inventive packet redundancy/duplication approach is not limited to URLLC services, rather, it may be applied to any application requiring a reliable transmission of data packets with a reduced latency. For example, applications using the transmission control protocol TCP/IP at a higher layer or similar connection-oriented higher layer protocols may be considered. The TCP has a slow start phase, where the site transmission window doubles with each transmission round. This leads to the slow start behavior where the throughput increases only over time. Speeding up the initial packets may increase the overall throughput of IP sessions that are mostly bursty in nature. For example, by a deep package inspection (DPI) that may be applied at the gateway of a network, startup packets may be detected and marked for the expedited treatment at the base station in accordance with the inventive packet redundancy/duplication approach. Alternatively, the base station itself may use the DPI at the PDCP layer, or at the higher layer before security is applied, so as to process such packets to benefit from an ultra-high reliability and low latency transmission.

Figure 8:
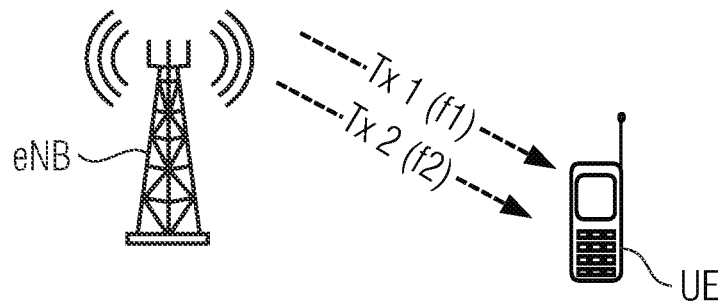
FIG. 8 shows an example for a packet redundancy/duplication with frequency diversity, in accordance with which a base station eNB serves a UE in the downlink direction via two transmission links TX1 and TX2 operating at the frequencies f1, f2.

In accordance with embodiments, a packet with a low reliability requirement or a no redundancy/duplication indication may be sent by the base station using just a single frequency f1, while a packet that includes a high reliability requirement or a redundancy/duplication indication may be duplicated to be transmitted over two or more frequencies f1, f2, over two or more physical links or a combination thereof. FIG. 8 shows an example for a packet redundancy/duplication with frequency diversity, in accordance with which the base station eNB serves a UE in the downlink direction via two transmission links TX1 and TX2 operating at the frequencies f1, f2. A first version of the data packet, e.g., the actual data packet, is transmitted to the UE over the first transmission link TX1 at frequency f1, and a second version of the data packet, e.g., a redundant version of the packet, is transmitted to the UE over the second transmission link TX2 at frequency f2. The level of redundancy/duplication (how many different versions of the data packet are send via different physical resources) as well as the selection of the physical resources (e.g. serving cells, links, component carriers, transmission points, antennas, beams etc.) is up the base station.

Figure 9:
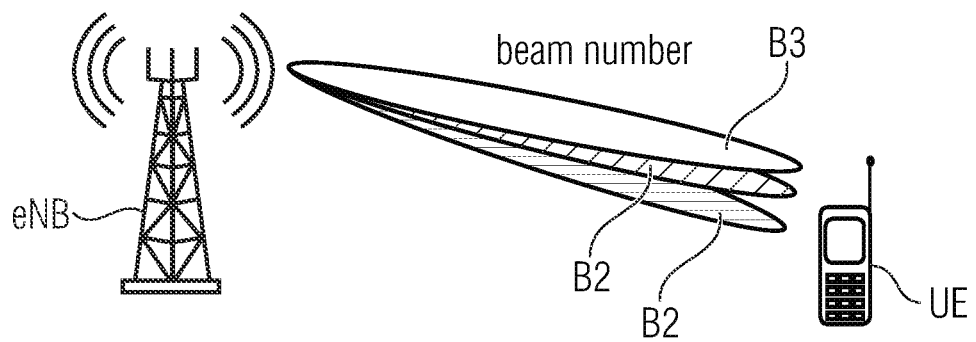
FIG. 9 shows a schematic representation of an embodiment in accordance with which the inventive packet redundancy/duplication is achieved using a beam diversity.

FIG. 9 shows a schematic representation of an embodiment in accordance with which the inventive packet redundancy/duplication is achieved using a beam diversity. The base station eNB serves the UE and the different versions of the data packet are transmitted via different beams B1 to B3 in time, for example different subframes, slots or mini-slots. The transmission may be signaled to the UE with a single resource allocation, and the UE/receiver tries to decode the packet using the multiple beams B1 to B3. In case one of the beams is considered to have useful information, the signal may also be combined with the other useful beams for a joint combining process.

Figure 2:
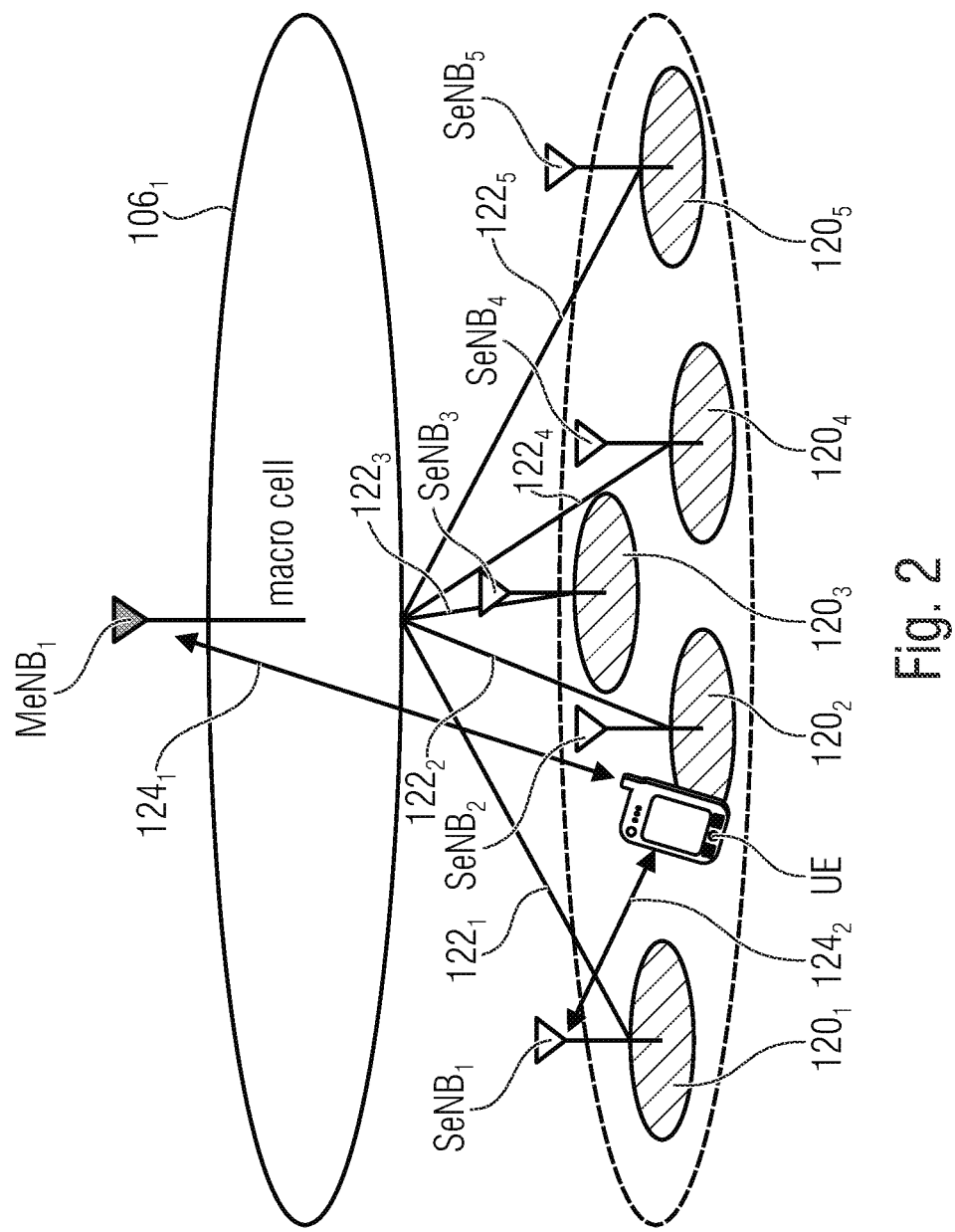
FIG. 2 shows a schematic representation of a cell, like a cell in FIG. 1, having two distinct overlaid networks, namely a macro cell network including a macro cell and a small cell network.
Figure 10:
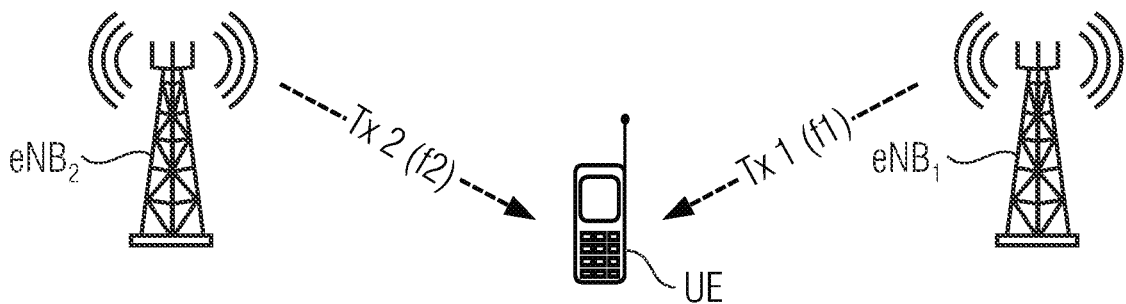
FIG. 10 shows the inventive packet redundancy/duplication approach implemented by site diversity and frequency diversity.

In accordance with other embodiments of the present invention, site diversity may be provided, for example by dual connectivity as it is schematically represented in FIG. 10 showing the inventive packet redundancy/duplication approach with a site diversity and frequency diversity. As is shown in FIG. 10, the UE is connected to a first base station $eNB_1$ and a second base station $eNB_2$, of which the first base station may be a primary base station and the second base station may be a secondary base station, as explained above with reference to FIG. 2. In accordance with other embodiments, both base stations may be primary base stations from adjacent cells, both serving the UE that, for example, may be at a cell edge. The first base station $eNB_1$ provides for a first transmission link TX1 to the UE, for example for transmitting a first version of the data packet, and the second base station $eNB_2$ provides for a second transmission link TX2 for transmitting a second version of the packet to the UE. The two base stations may also provide the transmission link on different frequencies f1 and f2. However, in other embodiments, the same frequencies for the transmissions may be used and a corresponding coordination of the resources needs to be performed. The base stations/transmitters eNB$_1$ and eNB$_2$ may be connected to a central baseband unit that coordinates the resources on a PRB basis. For example, for ultra-low latency the different PRBs may be assigned to the different transmission points at the same subframe or slot so that the two signals do not interfere with each other and the receiver may combine the signal without introducing any additional delay.

In case of dual connectivity the two base stations, which may be a master base station and a small base station, may negotiate with each other over an interface to add, to release and/or to modify certain links. The RRC signaling to the UE may be done by the MeNB (for example the eNB$_1$ in FIG. 10) for all links or by the MeNB for the MeNB links and by the SeNB for the SeNB links. In case the two transmission points are fully time synchronized, the transmission may be done as a single frequency network where exactly the same resources are used. In such an embodiment, the diversity is limited to a spatial diversity.

Configuration and Scheduling Decisions

In the following embodiments with regard to the configuration and scheduling decisions will be described. The wireless link, in general, may not be reliable so that multiple links for transmitting a packet are considered in accordance with the inventive redundancy/duplication process.

In accordance with embodiments, sending the different versions of the data packet may involve dual connectivity, and the MAC entities of the primary cell and secondary cell may additionally use standard carrier aggregation. This involves scheduling across multiple carriers (cross-carrier scheduling). The decision on a number of component carriers (CCs) may be made dynamically during the scheduling process based on QoS parameters of the packet or may be configured semi-statically for each bearer or logical channel during the bearer establishment by the RRC layer, or by a combination of both. The configuration may be decided by the base station or may be decided based on a UE pre-configuration in case of out-of-coverage or non-scheduled mode.

The semi-statics scheduling may comprise a semi-persistent scheduling (SPS) including the transmission of SPS setup/reconfiguration messages and/or SPS templates for the different versions of the data packet. SPS may be used when applying the inventive packet redundancy/duplication process during bearer set-up for an application using TCP/IP during the slow start phase of TCP. In case the packet redundancy/duplication is performed after the successful bearer setup, the SPS may be used for the PRACH/connection setup. The base station may schedule the UE in a safe operation mode, for example at a lower MCS level (for example QPSK). Once the connection is established, a higher reliability on a higher MCS level may be desired, for example a packet redundancy/duplication may be performed for 16-QAM, 64-QAM, 256-QAM or higher-QAM only.

In accordance with embodiments, the inventive packet redundancy/duplication approach may be used on very high frequency bands, for example in frequency bands greater than 6 GHz, for example in case of URLLC data. In such a scenario, the channel may not be so important since the channel is difficult to predict so that a static configuration is applied, while at lower frequency bands a dynamic configuration may be selected for the redundancy/duplication process.

In accordance with further embodiments, the inventive packet redundancy/duplication process may be limited to specific services or specific service requirements, like URLLC specific service requirements. In such embodiments, only URLLC constraint packets or other packets having a similar requirement are selected for the inventive packet redundancy/duplication process. This may be enabled by the QoS framework that identifies the flow identity or the quality class identify (QCI) of the packet and that maps each packet to a certain radio bearer at the PDCP layer and to a certain logical channel at the MAC layer. The data/packet redundancy/duplication may be configured on a per logical channel basis for carrier aggregation and on per radio bearer basis for dual connectivity.

In case of a dynamic link selection for the packet redundancy/duplication, some QoS parameters may be sent along with a packet to indicate to the MAC layer how to treat the packet. This may be a delay or timer value, for example a time to transmit, to indicate to the MAC layer that the packet needs to be transmitted immediately or to indicate how much time is left until the packet needs to be discarded. It may also be an indication to the lower layer that these packets belong together and experience a similar treatment. Such side information may become part of over the air control signaling using, for example, the PDCCH. This allows the receiver to identify that multiple resource allocations or multiple versions of the data packet thereof belong together. Further information that may be considered include statistics of errors in the past, for example ARQ/HARQ statistics, or experienced block error rates (BLERs).

In accordance with embodiments, the QoS settings may be preconfigured by the O&M of the network and the base station may set up the respective bearer and channel configuration for a UE during the bearer set up. This may be done by the RRC layer. At the base station site, the RRC layer may configure the lower layers of the base station and the RRC layer will also provide the respective signaling towards the UE. This may be part of a RRC reconfiguration message and once the UE RRC layer receives the reconfiguration message from the base station it configures the affected lower layers on the UE site respectively. There may be two independent configurations for the downlink data and for the uplink data. Both the base station and the UE lower layers transmitting and receiving entities are configured accordingly. Part of the RRC configuration may be an information element which indicates whether the inventive packet redundancy/duplication is enabled or not, for example per bearer or per logical channel. The information element may indicate the number of versions of the data packet, for example, how many different links are to be used for sending the different versions of the data packet. Such an information element (IE) may be part of the configuration data of the respective layer, for example the PDCP layer or the MAC layer. As there are multiple entities and as configuration needs to be done for the uplink and for the downlink independently, there may be several instances of this parameter.

In accordance with other embodiments, the inventive packet redundancy/duplication may be used to meet a pre-defined block error rate (BLER) at extremely low latencies. The configuration of the inventive redundancy/duplication process depends on the QoS requirement to be met for a specific packet. The BLER also depends on the quality of the respective link or carrier. If resources are available at a low frequency with high reliability, packet redundancy/duplication may not be used.

The decision on the overall configuration may be determined by the Radio Resource Management (RRM) of the base station. The links or carriers may be added based on signal strength or signal quality, wherein interferences may also be considered. If a signal strength of a certain link or carrier is high enough, a packet redundancy/duplication may not be required. However, if need be, also the additional links/carriers make use of a certain minimum signal strength/quality.

In accordance with the above embodiments, the configuration and operation of the packet redundancy/duplication process may be two-fold. First, there may be a semi-static configuration provided by the RRC layer as described above and within the limits of the RRC configuration the lower layer may operate dynamically, for example the PDCP may route the different versions of the data packet via multiple dual connectivity links or the MAC layer may schedule the different versions of the data packet on different carriers or repeat transmission on the same resource. While the base station scheduling and routing algorithms may control the packet redundancy/duplication process in the downlink, the UE may be instructed dynamically by means of the base station scheduling decision (uplink grants) or the UE may, within a certain range provided by the base station configuration, make its own scheduling decisions for the packet redundancy/duplication.

In accordance with further embodiments, the UE may communicate using a direct communication link, also referred to as a sidelink or PC5 interface, and the configuration of the packet redundancy/duplication process may be based on respective pre-configurations.

Time Coordination of Data Duplication

In accordance with the inventive packet redundancy/duplication approach, the transmission of the different versions of the data packet over the different physical resources is coordinated in time. For example, when considering dual connectivity, each base station of each link may be operated independently without a time synchronization between the links so that the multiple transmissions of the different versions of the data packet may be coordinated in time.

The time coordinated transmissions may enable a joint or intelligent decoding at the receiver site, however, at the same time ensures a timely delivery of the different versions of the data packet to the higher layer. The timing fulfils certain requirements for all transmissions on all physical resources, for example, in the case of a joint decoding, the receiver needs to wait for the last physical resource to be received before the joint decoding process may start.

A transmission/reception time window may be used which may differ dependent on what physical resources are selected for implementing the inventive packet redundancy/duplication approach. For example, the time window for dual connectivity may be larger than the time window for carrier aggregation, because in accordance with dual connectivity the data needs to be forwarded from the master base station to the secondary base station via an internal interface of the radio access network using a different transport technology (different when compared to the radio link for serving the UE). The time available for transmission and reception may be hard coded, thereby providing sufficient time for all kinds of different deployment options and transport network configurations. The time may depend on the actual packet redundancy/duplication approach, like duplication by means of carrier aggregation or by means of dual connectivity, or it may be configurable by the radio resource control (RRC).

Dependent on the configuration, the receiver may know exactly at which slot, subframe and the like, the different versions of the data packet are transmitted/received, or the receiver may know the time window during which the different versions of the data packet are received. In the case employing a time window, the transmitter has some freedom for scheduling the packet redundancy/duplication. During the time window the UE receiver may monitor a set of resources for the different versions of the data packet on different resources or repetitions on the same resource, for example by decoding PCCCH control information for a number of slots/subframes to monitor.

In accordance with embodiments a fixed timing relation may be used, which may be the simplest approach in terms of signaling overhead. However, in accordance with other embodiments, flexibility may be useful, for example in cases including different URLLC latency requirements. In such cases, the timing relation may be kept flexible for the different services and the detailed point of time or the time window may be configured for each bearer or logical channel. In case of a split bearer for dual connectivity, the parameter is valid for each link and in case of carrier aggregation it is valid for each carrier.

RRC Configuration for Packet Redundancy/Duplication

In the following, embodiments will be described concerning a modification of the RRC configuration when implementing the inventive packet redundancy/duplication approach. So far, the general RRC configuration of a radio bearer, including a logical channel or transport channel configuration, has been described. Now a lower layer configuration for a dynamic reconfiguration of is described.

A configuration may be provided that limits the overall complexity by configuring a plurality of sets of physical resources, but using only a subset thereof. The selection of the physical resources to use may be switched using a fast PDCCH control channel signaling or using embedded MAC control elements. When considering three RRC configurations for the inventive packet redundancy/duplication approach on two different physical layers, the RRC may provide for a basic configuration, while the MAC layer may provide for a fast switching. The table below provides an example for different parameter configurations.

| RRC Parameter Configuration | 1 | 2 | ... | N |
|---|---|---|---|---|
| Transmission Point Identity | ... | ... | ... | ... |
| Cell Identity | ... | ... | ... | ... |
| Frequency band | ... | ... | ... | ... |
| Resource pool configuration | ... | ... | ... | ... |
| Semi-Persistent Scheduling configuration | ... | ... | ... | ... |
| Number of retransmissions | | | | |
| Demodulation Reference Symbols configuration | ... | ... | ... | ... |
| MIMO Antenna configuration | | | | |
| PDCCH control channel configuration | ... | ... | ... | ... |
| UE feedback reporting configuration | ... | ... | ... | ... |
| ... | ... | ... | ... | ... |

Once the all RRC configurations are available, the lower layer may independently switch between the different configurations, like RRC parameter configuration set 1, 2 or N, or a combination of different configurations may be used. The selected set is informed to the UE so that the UE knows all the details that may be used for monitoring and decoding the respective physical resources. For example, resource pools or semi-persistent resources may be configured with quite detailed information about the PRBs, the modulation coding scheme, the MIMO scheme, the number of repetitions, the control channel and the like. The base station scheduler, based on QoS requirements, resource availability and other indications, may decide about packet redundancy/duplication and may also inform the UE via a DCI message about a scheduling decision and the respective RRC parameter set to be used. When considering the table above, in case there are 3 transmission points, there are 8 possible combinations of transmission points (TP). The different versions of the data packet may be transmitted via TP1, TP2, TP3, TP1+TP2, TP1+TP3, TP2+TP3 or TP1+TP2+TP3.

An advantage of the above described embodiment using a detailed RRC configuration is that a single control channel grant may point to multiple physical resources and allow the UE to decode such multiple resources.

The packet duplication may also be pre-configured via templates, e.g. used in semi-persistent scheduling (SPS). Here, basic duplication cycles may be pre-configured, such that packet duplication can be activated/deactivated with efficient signaling. Similar to conventional SPS configuration, e.g. used for voice traffic, this SPS-duplication context may contain a pointer to a RRC template with a time interval, when to schedule or utilize packet duplication. Furthermore, this may also contain messages such as start, stop, reconfiguration and delete messages similar to the messages used in state-of-the-art SPS.

Control Information Transmitted Via PDCCH or MAC CEs

In case of dynamic scheduling, it may be advantageous to pre-configure the physical resources semi-statically by RRC signaling, for example by providing a RRC reconfiguration message, and to dynamically switch between the resources. In case of downlink scheduling, once the RRC reconfiguration is completed and the duplication decision function at the MAC layer of the base stations made its decision to activate certain physical resources or to switch between physical resources, the MAC layer of the base station may inform the UE about its decision by fast DCI signaling on the lower layer control channel, like a PDCCH grant, or via an embedded MAC control element (MAC CE). While a MAC CE may contain a simple activate/deactivate bit map, the downlink control information (DCI) mapped on the downlink control channel, for example PDCCH, may contain additional control parameters that may be used for decoding the different versions of the data packet.

Figure 11:
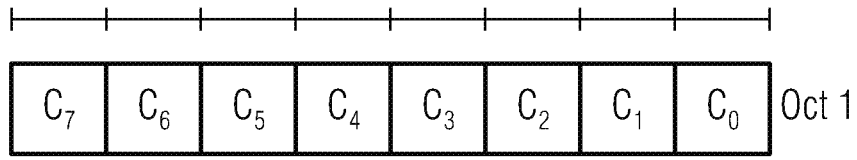
FIG. 11 shows an embodiment for a MAC CE to activate/deactivate physical resources for the packet redundancy/duplication in accordance with the present invention.

Based on certain criteria or triggers, a MAC CE may be embedded within an uplink or a downlink data PDU. The MAC header may identify a certain MAC CE type, for example by means of a logical channel identity or anther identifier. FIG. 11 shows an embodiment for a MAC CE to activate/deactivate physical resources for the packet redundancy/duplication in accordance with the present invention. The MAC CE may be octet aligned and $C_1$ may represent the index of a RRC configured physical resource. A "1" may indicate that a resource is activated and a "0" may indicated that the respective resource is deactivated. Further, $C_0$ may indicate a first RRC parameter configuration set, $C_1$ may indicate a second RRC parameter configuration set, etc. Dependent on the protocol design, after an initial RRC configuration, the configured physical resources may already be activated or may not yet be activated. For example, when considering carrier aggregation, the small cells may not yet be activated, and a MAC CE for the activation/deactivation of small cells need to be sent first to active the respective small cells. The MAC CE is advantageous in that the PDCCH overhead that is transmitted in each resource allocation is reduced.

The MAC CE does not allow sending different control information for each resource. This may be provided by employing the PDCCH. The PDCCH may be used to adapt the inventive packet redundancy/duplication approach for every resource allocation. In case of a dynamic scheduling of different resources the base station will signal a PDCCH resource allocation for every physical resource allocation the packet redundancy/duplication is scheduled on. There may be a redundancy/duplication indication that there are different versions of the data packet to make the physical layer aware of the redundancy/duplication. With this information, the PHY layer knows that it is allowed to combine all the different versions of the data packet received at a certain time or within a pre-defined or configurable time window, for example within a mini-slot, a slot, over multiple subframes. The combining may be similar to HARQ processing. When applying the inventive packet redundancy/duplication approach, like for a URLLC service, there are multiple transmissions at the same time which are combined for providing the desired reliability. In accordance with examples, a maximum ratio combining (MRC) may be applied for the combining of the different versions of the data packet received over the multiple links. The combining may be based on sampled soft-values of the modulation symbols before the decoder input, e.g. log-likelihood ratios (LLRs), and the combining may be weighted based on a reception quality. The combining may employ the same or different HARQ processes and, in case of a single process across different resources, the related signaling may be reduced. This means that the receiver knows from a redundancy/duplication indicator that the some parameters are applied, for example HARQ sequence number, HARQ process number, HARQ new data indicator or HARQ redundancy version.

Figure 12:
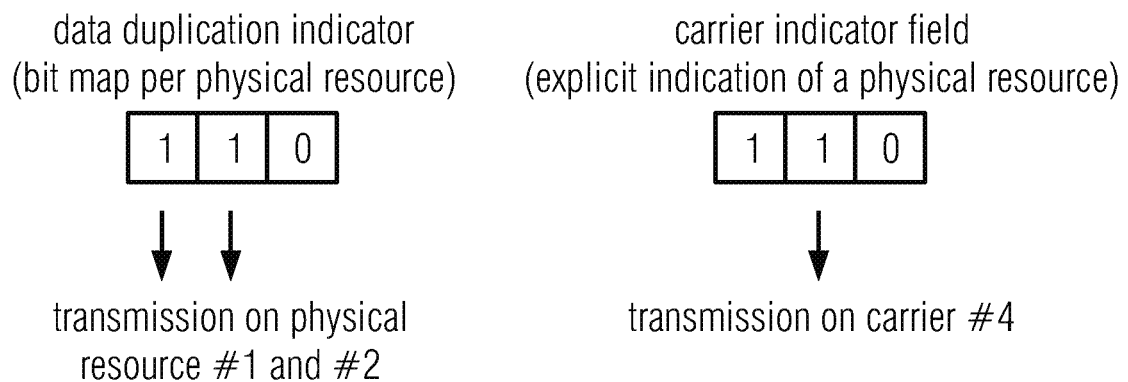
FIG. 12 shows a first embodiment of a packet redundancy/duplication indicator field versus a conventional carrier indicator field.
Figure 13:
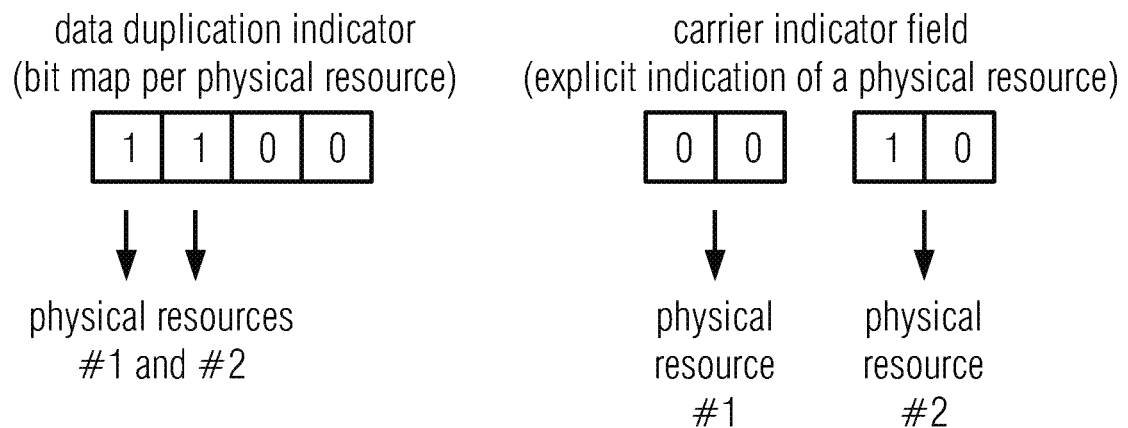
FIG. 13 shows another embodiment of the packet redundancy/duplication indicator of the present invention versus the conventional carrier indicator field.

Dependent on the type of physical resource for a packet redundancy/duplication, the indicator field may be defined as a part of a DCI message. Other than the carrier indicator field (CIF) as it is, for example, used in LTE carrier aggregation that only indicates a single carrier, the packet redundancy/duplication indicator field may indicate the transmission on multiple resources. The redundancy/duplication indicator field may be a bit map rather than an explicit indication. FIG. 12 shows a first embodiment of a packet redundancy/duplication indicator field versus a conventional carrier indicator field. Signaling of the packet redundancy/duplication on three physical resources may be supported by the 3-bit bit map, while the same signaling with the existing carrier indicator field (CIF) explicitly points to a carrier number, for example to carrier number 4, in case the following coding is used {000=1, 100=2, 010=3, 110=4, 001=5, 101=6, 110=7, 111-8}. In case the number of physical resources is limited to packet redundancy/duplications using only two physical resources, these two resources may be indicated separately and explicitly using similar bit-maps, for example {00=1, 10=2, 01=3, 11=4}, as is shown in FIG. 13 showing another embodiment of the packet redundancy/duplication indicator of the present invention versus the conventional carrier indicator field.

Although the DCI indication may be done dynamically for the physical resource, the RRC signaling may exist for a more detailed configuration of each physical resource, indicating, for example, the MIMO mode, the selected antenna or antenna beam, the modulation coding scheme (MCS), the frequency band, the component carrier, the physical cell identity of a link, the transmission point identifier or certain sequences for demodulation reference symbols and the like (see the above table). Once the RRC reconfiguration is done, packet redundancy/duplication by the dynamic DCI signaling may be quickly switched on/off per physical resource allocation. The dynamic decision may be done by the base station. For example, in case of a downlink URLLC data transmission, the base station may send the downlink control information (DCI) as part of the downlink resource allocation to the UE.

Intelligent Decoding of Duplicated/Redundant Packets

In the following, further embodiments of the inventive packet redundancy/duplication approach are described allowing for an intelligent decoding of the different versions of the data packet transmitted via the separate links.

Multiple PDCCH resource allocations may be used to decode the packet, for example, the URLLC packet. The UE may successfully decode the resource allocation for one link but may not be able to decode the different versions of the data packet transmitted over this link. The PDCCH control may be sent with a higher reliability when compared to the actual data so that, due to the information obtained via the DCI, the receiver is aware that packet redundancy/duplication is used, for example a transmission using transmission points TP1 and TP2, and the receiver further knows the RRC pre-configuration of each link. Based on this knowledge, the UE may combine the received information, for example by using maximum ratio combining (MRC) for the quantized symbol information, and may, using the combined information, like soft-bits, of the different links, successfully decode the data even although it only received the PDCCH of a single link. The two PDSCH transmissions may also be decoded separately if soft combining is not possible, for example due to different encoding or different modulations selected, and separate decoding may be faster in case the resource allocation is then time shifted.

Figure 14:
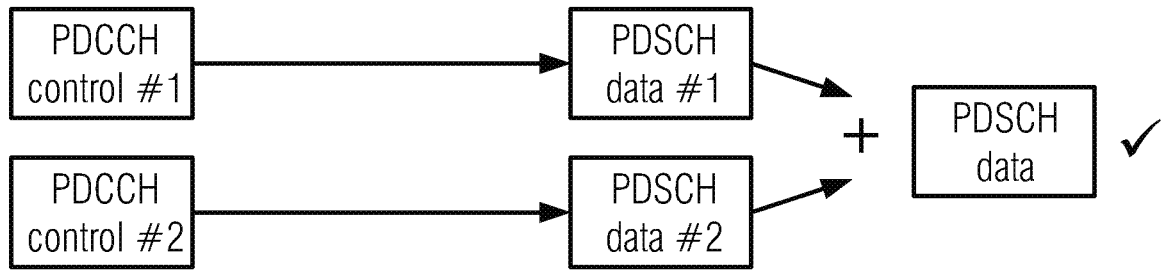
FIG. 14 shows a schematic representation of the control information and the data transmitted to the receiver via two transmission links
Figure 15:
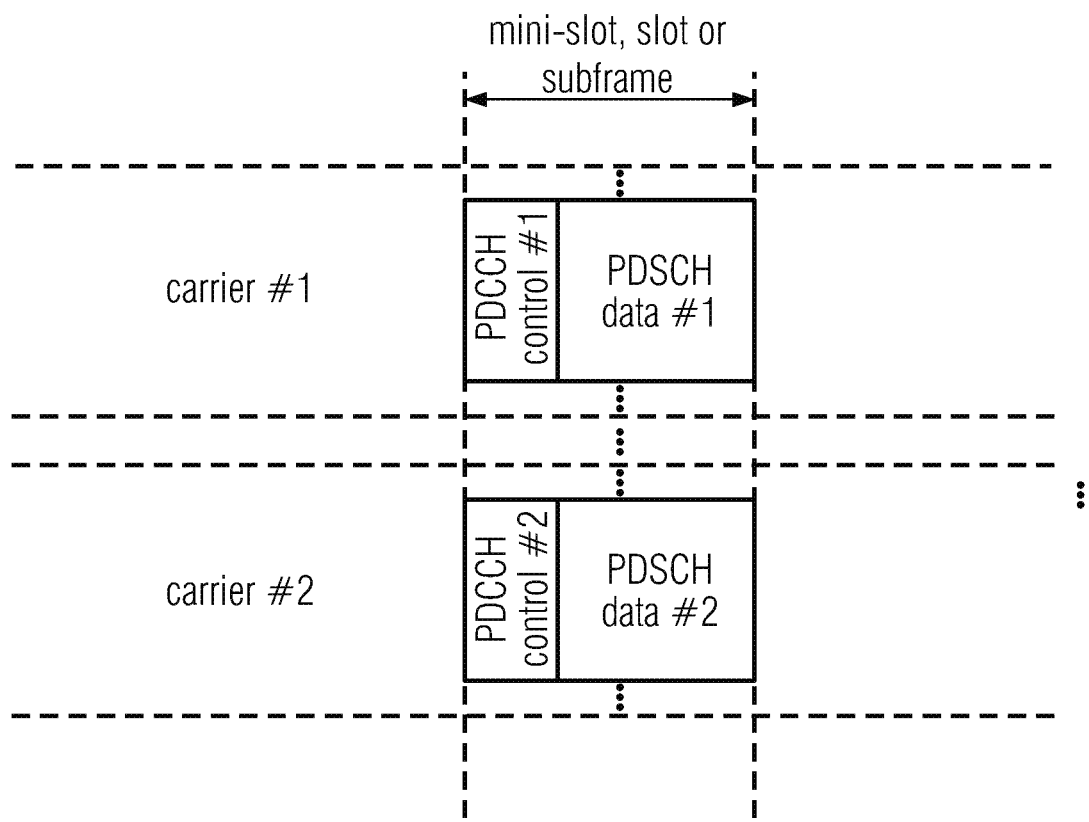
FIG. 15 shows two carriers including within a resource block, like a mini slot, slot or subframe, the PDCCH and the PDSCH carrying the respective control information and data referred to in FIG. 14.

FIG. 14 shows a schematic representation of the control information and the data transmitted to the receiver via two transmission links. Each transmission link carries the PDCCH including the control messages control #1 and control #2. Further, following the control information, each link carries the PDSCH which includes the different versions of the data packet (data #1, data #2) which may be combined. The check mark at the right-hand side in FIG. 14 schematically indicates that the combined decoding of the data was successful. Although FIG. 14 illustrates the control and the data part to be separate, in accordance with embodiments, they may be part of one self-contained physical resource allocation. FIG. 15 shows two carriers, carrier #1 and carrier #2, including within a resource block, like a mini slot, slot or subframe, the PDCCH and the PDSCH carrying the respective control information and data referred to above in FIG. 14.

As mentioned earlier, in accordance with an embodiment of the present invention, the inventive packet redundancy/duplication approach may be implemented using carrier aggregation so that the different versions of the data packet are send on multiple (two or more) carriers, for example on carrier #1 and on carrier #2 as depicted in FIG. 15. Dependent on the number of information bits for the control and the number of information bits for the data, different resources may be used. As indicated in FIG. 15, the control may be sent at the beginning of the transmission to provide time for decoding and to limit the overall processing time.

Figure 16:
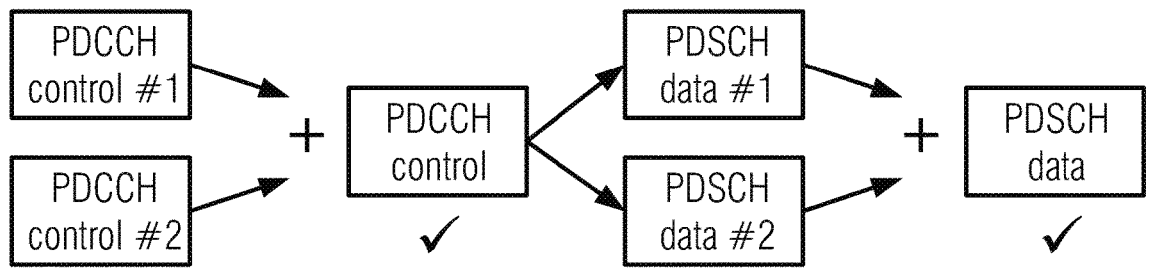
FIG. 16 shows a schematic representation of the combining of control information received via two links, and using the combined control information for decoding the data 2 received via the two links.

In accordance with embodiments, the reliability of the control channel may be increased by allowing the UE to soft combine the PDCCH signaling of multiple semi-statically configured links. This may also be referred to as a control channel redundancy/duplication. If two links are semi-statically configured for all transmissions, the PDCCH information from the two links may be continuously combined before decoding so that the reliability of the control information received may be increased. This may ensure that the PDCCH control resources are sent more reliable or at least with the same reliability as the data on the shared channels. When the control information may not be decoded, the respective data or information may be lost and no HARQ retransmission is possible on the control channel and also not on the data channel. In this case, the complete PDCCH control information needs to be the same, unless the DCI is split into multiple parts each containing a CRC code for an error check. Such a scheme may be advantageous in case there are multiple physical resources that are not reliable for its own. FIG. 16 shows a schematic representation for combining of control information received via two links in the PDCCH channels, and using the combined control information for decoding the respective data #1 and data #2 received via the two links over the PDSCH. The data represents the different versions of the data packet so as to obtain, as is indicated at the right-hand section of the FIG. 16, the data packet. The check mark schematically indicates that the combined decoding of the data was successful.

Figure 17:
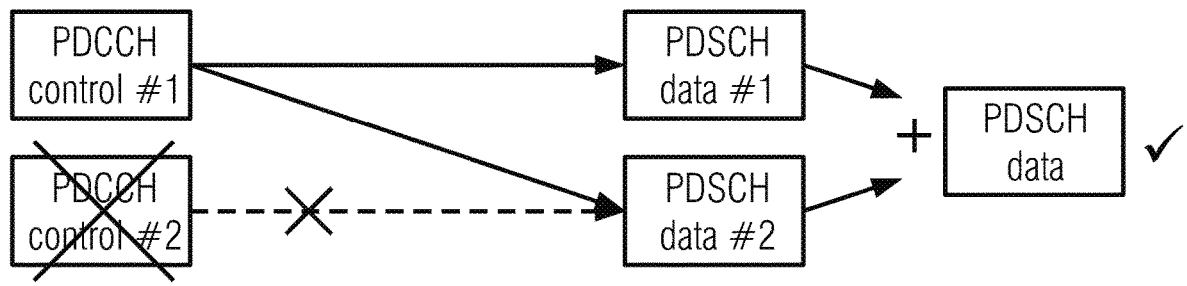
FIG. 17 shows an embodiment in which control information is received only on one of the links.

In accordance with other embodiments, some of the PDCCH control information for the second link may be obtained based on information received from the first link. Each PDCCH may be self-decodable and, based on the decoding of the first PDCCH, detailed parameters of the different data transmission may be obtained. For example, the inventive packet redundancy/duplication approach may be preconfigured for a split bearer, and the relative timing between the multiple transitions may be pre-defined or pre-configured. This may be advantageous in case one link is considered more reliable than the other link. In case multiple links share a HARQ process or different HARQ processes running synchronously, part of the HARQ information may be the same or may be derived. FIG. 17 shows an example in which only the control information on the first link, namely control #1, is received. The PDCCH on the second link is not available. On the basis of the control #1 transmitted in the PDCCH of the first link, the respective data on the two links, namely data #1 and data #2 may be successfully decoded and combined so as to obtain the transmitted data packet.

In accordance with other embodiments, to support intelligent decoding with a limited number of possible combinations, the different links may use the same coding and modulation, i.e., the same link adaptation parameters. Using the same link adaption parameters is advantageous as a robust format across multiple physical resources may be provided. In case a fixed configuration is used for a data packet, like a URLLC data packet, the format to be used may be semi-statically configured by the RCC, for example via semi-persistent scheduling, and no signaling is added to the PDCCH control channel, as it is inherently known at the receiver. In case a link adaptation takes place, the same parameters will be signaled via the duplicated links and in both cases the advanced processing, as described before, may be used.

When PDCCH combining is done before decoding the control information of the multiple link, the control information transmitted on the PDCCH channel may be the same. Therefore, all the information that the scheduler decides for one link is applied also for the other links. For example, in case frequency hopping or power control is used on one link or one carrier, it is also used on the second link. In a similar way, in case certain actions are requested from the UE, for example a RACH request or a channel report request, it will also be requested synchronously on all links. PDCCH signaling size may be reduced or minimized by fixing some of the parameters and using the semi-static RRC configuration which, as a consequence, allows making the PDCCH decoding even more robust.

Packet Redundancy/Duplication Using Single PDCCH Resource Allocation

The embodiments described above relate to PDCCH combining so as to increase the reliability of the PDCCH signal and to utilize the diversity of the different physical resources.

Figure 18A:
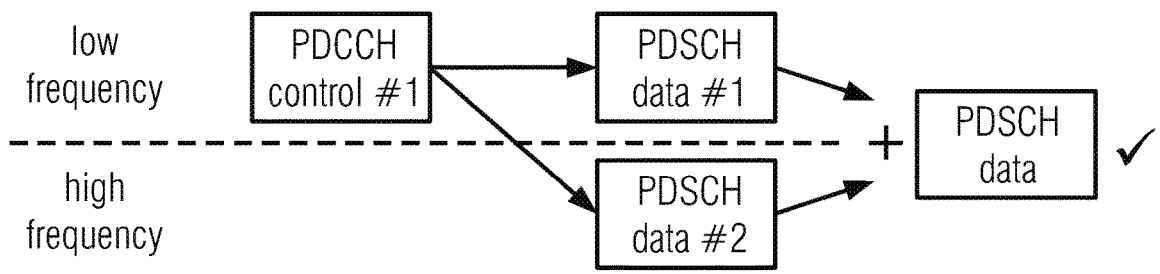
FIG. 18A is a schematic representation of embodiments using only a single PDCCH.

In accordance with another embodiment, a single PDCCH allocation on one physical resource may be used that points to one or more additional data signal transmitted on different physical resources. FIG. 18(A) is a schematic representation of embodiments using only a single PDCCH. As may be seen, on a first link, like a low frequency link, the PDCCH control information control #1 is provided to the receiver and is used to decode the data sent on both links. The second link may be a high frequency link. Thus, the control #1 includes information as to the resources used for transmitting data #1 and data #2 so that the receiver may monitor these resources for the data and then combine the received data on the two links so as to complete the data packet transmission. This embodiment allows using the available resources on the higher frequencies fully for the data transmission which allows for a further increase of the reliability of the data transmission.

In the embodiment of FIG. 18 the transmission links are split between low and high frequency bands. The high frequency band may be the millimeter wave band at 28 GHz or at 60 GHZ, and may be used for the packet redundancy/duplication process of the present invention on top an existing transmission at the lower frequency band. The lower band may be more reliable due to the better propagation in the sub 6 GHz range, however, it may not provide as much bandwidth as is offered by the upper band. While the upper band offers ultra-high capacity; it may not be reliable enough so that the PDCCH resource allocation, including the indication for the inventive packet redundancy/duplication, may be sent on the reliable link only, as depicted in FIG. 18(A). The control information points to the physical resources in the lower band and in in the upper band. Once a transmission requiring a high reliability is detected, such as an URLLC transmission, a redundancy/duplication indication flag is set as part of the downlink control information, and the UE will know how to decode the different versions of the data packet. For an uplink transmission, an additional downlink resource allocation or a uplink grant will indicate to the UE to transmit the different versions of the data packet on the indicated physical resources.

In accordance with further embodiment, the higher band may utilize a larger subcarrier spacing SCS and a higher bandwidth so that the different versions of the data packet may be transmitted faster. This may be used as a duplicate/redundant fast push in a simultaneous transmission, but it may also be used just in case of a retransmission where the UE may not decode the data on the lower band.

Multi-RAT Packet Duplication

In accordance with other embodiments, a carrier at a high frequency band may be added to an existing carrier at a lower frequency band, wherein the high frequency band carrier may operate in accordance with a first radio access technology, such as 5G/NR, and the carrier at the lower frequency band operates in accordance with LTE. In such an embodiment, the PDCCH resource allocation may be sent using one radio access technology, while the data is sent on another radio access technology or on multiple radio access technologies. The PDCCH resource allocation may contain indications that packet redundancy/duplication in accordance with the present invention is used, for example, on multiple RATs. For example, in case the RAT used for transmitting the PDCCH does not transmit any data in accordance with the inventive packet redundancy/duplication, at least two further RATs are used. However, in case the RAT used for transmitting the PDCCH also transmits one of the different versions of the data packet, at least one further RAT for transmitting the other one of the different versions of the data packet is used.

The RRC may configure the other link(s) for packet/duplication, potentially even reserving resources. Once receiving the PDCCH grant with the redundancy/duplication indication on the first link, like the LTE link, the UE may explicitly derive all the parameters that may be used for the second link, like the 5G/NR link, to receive the different versions of the data packet. The RRC may have previously configured the frequency band, the RAT specific parameters, the transition mode and the link adaption parameters so that soft combining between the different RATs is possible.

Data Duplication Across Different Numerologies

In accordance with embodiments, numerologies used for different carriers may be considered, e.g., a 15 kHz SCS in a low band, and a 120 KHz SCS in a high band, and more than one version may be mapped into the high band as well as more versions belonging to several users or connections/links can be multiplexed in the same high band.

When applying the inventive data duplication over several carriers, e.g., in 5G/NR, e.g. lower frequency bands and high frequency bands, different numerologies may be used. For example, 5G/NR defines a basic numerology which uses a $2^n \ast 15$ kHz subcarrier spacing with n=0 for the basic numerology as well as a support of a scalable numerology of at least from 15 kHz to 480 kHz subcarrier spacing. In operation modes which include several component carriers, such as carrier aggregation or dual connectivity, data may be send over several carriers resulting in mixed numerologies having to operate on the same data. An example is that in a carrier aggregation mode, the primary component carrier uses the basic numerology with a SCS of 15 kHz and aggregates a secondary component carrier operating in a high frequency band (e.g. 28 GHz or 60 GHZ) configured with 120 KHz SCS. The larger SCS allows a faster transmission (in the example by a factor of 8) of physical resources. Furthermore, the high frequency band will most likely support a much larger bandwidth, e.g. 250 MHz or 500 MHz or higher, and thus allow a much larger capacity. Consequently, a much larger number of physical resource blocks (PRBs) may be transmitted within the same time window in the high frequency band. In case of data duplication for URLLC, this can be utilized to transmit higher redundancy in the same time window, e.g. by repetition coding, or multiplexing of several duplicated PRBs from different UEs in the same time window.

Figure 18B:
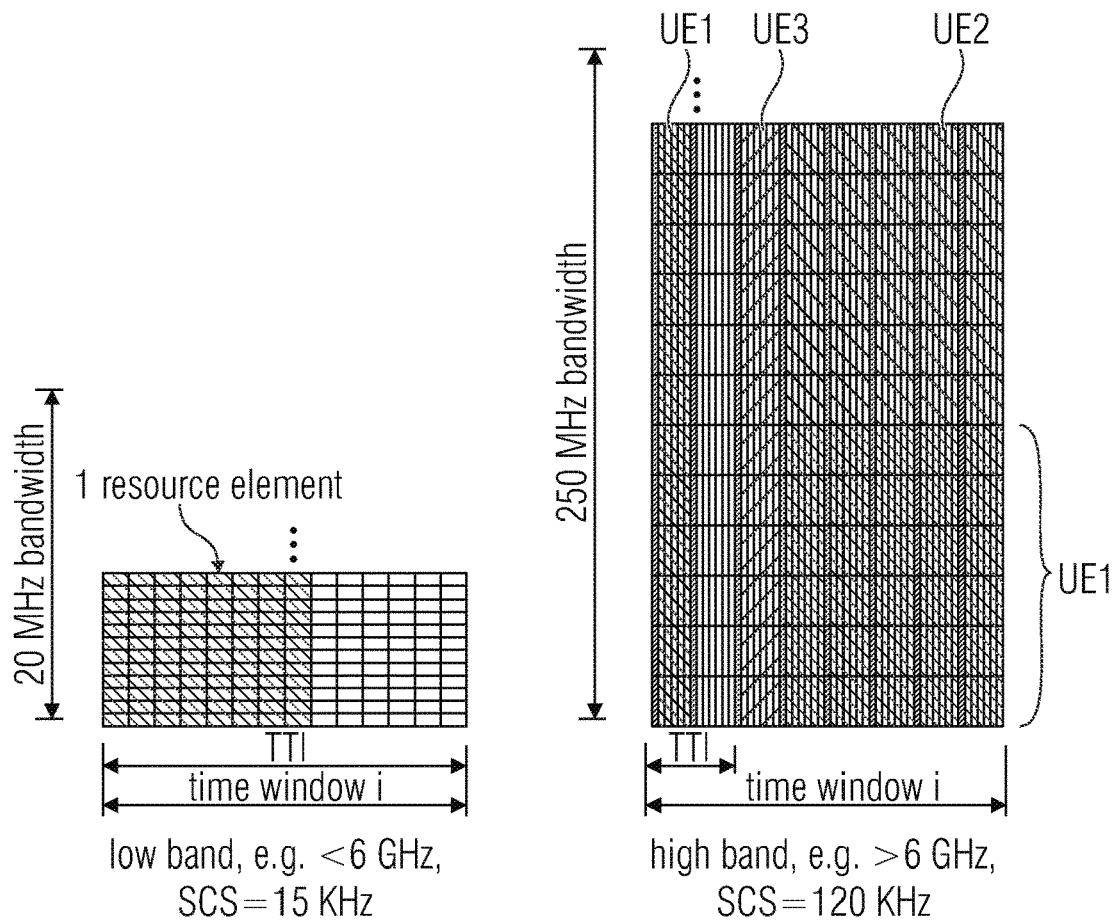
FIG. 18B shows an embodiment using packet duplication in a mixed numerology scenario with 15 kHz on a low frequency band, and 120 kHz on a high frequency band.

An example of packet duplication in a mixed numerology scenario is given in FIG. 18(B). Here, in addition to data allocated to a first user $UE_1$, data allocated to a second and third user $UE_2$, $UE_3$ may be multiplexed within the same time window i. Thus, the additional PRBs may either be used for $UE_2$ and $UE_3$ or may be used for adding additional redundancy (PRBs allocated to $UE_1$) for implementing the inventive approach.

PDCCH Packet Duplication Using Dual Connectivity

In case of dual connectivity, there are individual schedules for the master base station and for the secondary base station. In accordance with embodiments using the above described intelligent decoding, both links are synchronized and transmit the PDCCH control information in the downlink. The decision will be done by the master base station and signaled to the secondary base station along with the different versions of the data packet, and the secondary base station will use all the parameters provided by the master base station. This involves that downlink control information or uplink control information needs to be added to the interface between the master base station and the secondary base station.

Figure 19A:
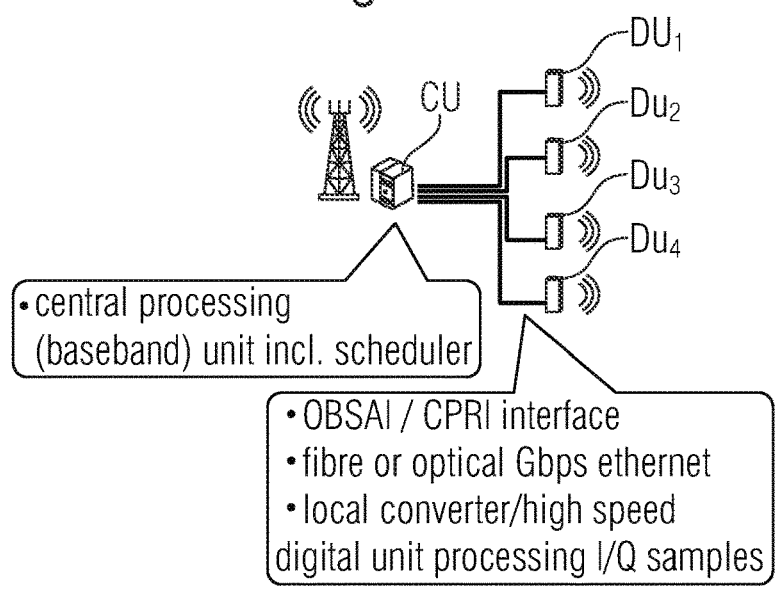
FIG. 19A shows a schematic representation of a C-RAN (Cloud RAN) implementation including a central unit controlling multiple distributed units for implementing the inventive approach.

A similar signaling may be implemented for a C-RAN (Cloud RAN) implementation including a central baseband unit (BBU). FIG. 19A shows a schematic representation of a C-RAN implementation including a central unit CU controlling multiple distributed units $DU_1$ to $DU_4$. The central unit CU provides all transmission parameters to the DUs including the RRC configuration for the lower layer, like the bearer and logical channel configurations, as well as part of the dynamic scheduling information. For a regular transmission, the scheduler of the DUs may make its own independent scheduling decisions including a link adaption; however, when applying the inventive packet redundancy/duplication approach for a reliable data transmission, like a URLLC transmission, the CU makes such a decision and forwards it, for example, by means of a downlink or uplink control information (DCI, UCI) to the DUs. Multiple DUs may be involved in the transmission of the packet. The control information from the CU may enable the DUs to transmit the same PDCCH control information that enables the intelligent decoding of duplicated data as described above.

In addition to the parameters for the link adaption, the MIMO mode and the like, the CU may also provide each DU with a certain time window in which the packet has to be transmitted or a maximum time, counted from the reception of the packet, until the packet needs to be discarded. This is advantageous as it supports a timely transmission and the combining of the received signal of the decoded data at the receiver. In case a combined PDCCH decoding is used or in case a static resource for URLLC is configured, the CU may also decide about detailed resource allocation, i.e., what PRBs should be used at the DUs.

Figure 19B:
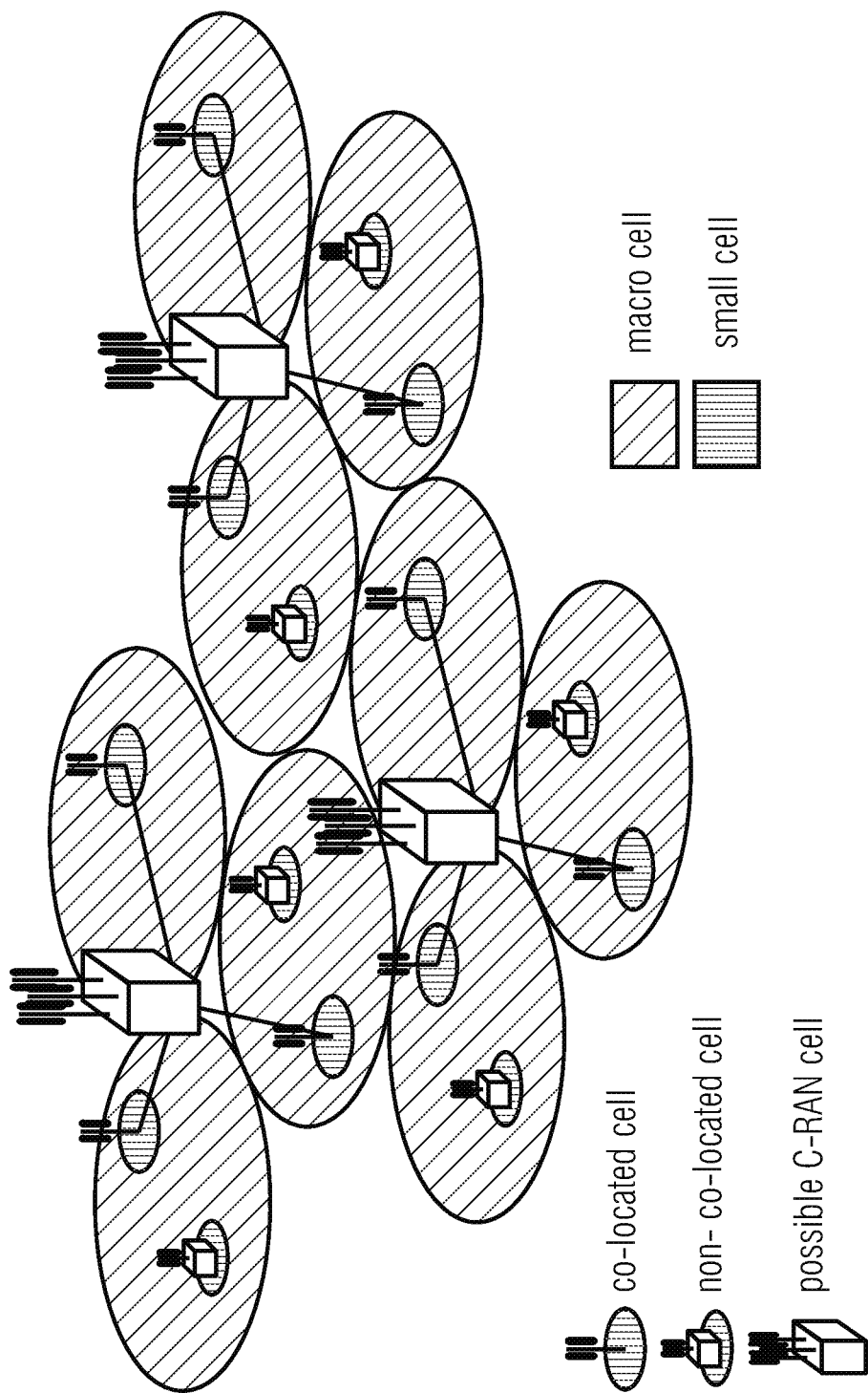
FIG. 19B shows a C-RAN cell layout for NR and LTE coexistence in accordance with an embodiment of the present invention.

FIG. 19B shows a C-RAN cell layout for NR and LTE coexistence in accordance with an embodiment of the present invention. The network comprises heterogeneous components, e.g. macro and small cells. The macro cell is implemented as a Cloud-RAN (C-RAN) base station. A C-RAN base station may be implemented by a large number of base station sectors, e.g. from 3 to 48 or even higher number of sectors depending on computing capabilities and interface capacities. The remote or distributed sites, e.g. small cells, as well as the base station sectors itself may be realized by remote antenna systems or smart antennas. These may be connected with state-of-the-art antenna interfaces, e.g. coaxial cable or optical interfaces (e.g. CPRI, OBSAI), or alternatively utilizing certain functional splits. The inventive packet redundancy/duplication approach may be extended to a C-RAN deployment as shown in FIG. 19B. For example, when applying carrier aggregation/dual connectivity/multi-RAT, The RRC of a first Cloud-RAN (C-RAN) base station has to inform a second C-RAN base station, which sector is performing the inventive parallel transmission (redundancy/duplication).

Figure 19C:
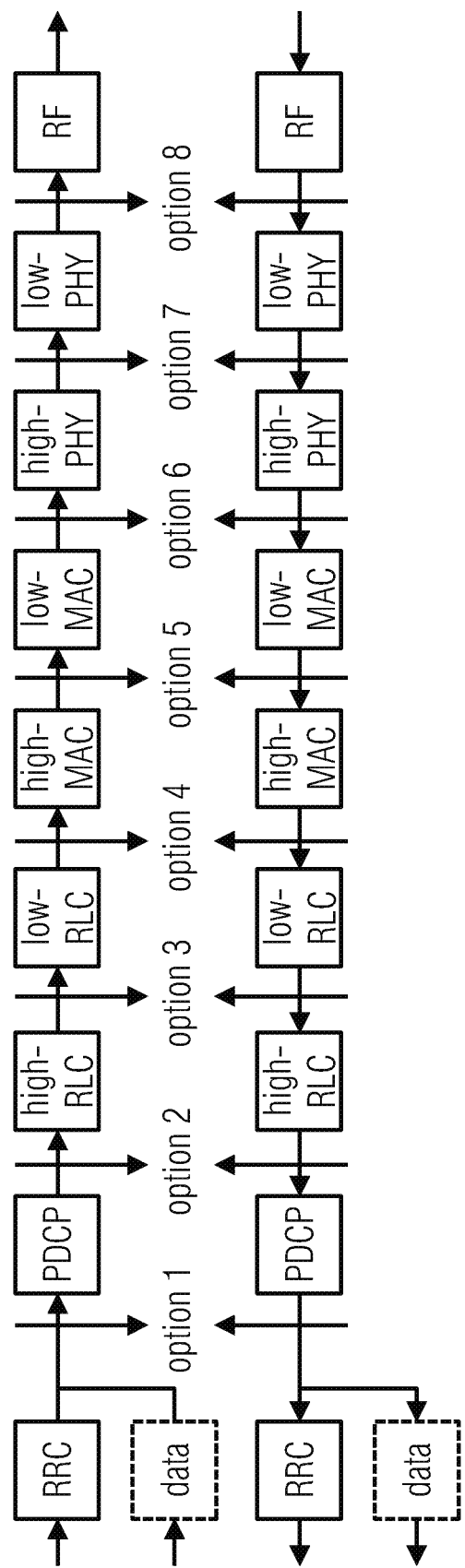
FIG. 19C shows examples for the functional split between a central unit (CU) and a distributed unit (DU) in a C-RAN cell layout.

FIG. 19C shows examples for the functional split between a central unit (CU) and a distributed unit (DU) in a C-RAN cell layout, as described, e.g., in 3GPP TR 38.801 V2.0.0 (2017-3). The functional splits between antenna and baseband processing in LTE/NR depend on the protocol stack as well as on the performance requirements within the protocol stack. Performance requirements are latency requirements, e.g. delay constraints defined by ACK/NACK messages of retransmission protocols, as well as throughput requirements of sample streams. Possible functional splits, namely options 1 . . . 8, are depicted in FIG. 19C. On the left side, FIG. 19C shows the interface to higher layers, and on the right side, the interface to the antenna or radio frontend (RF) is shown. The inventive packet redundancy/duplication approach may be extended to a C-RAN deployment as shown in FIG. 19C. For example, when implementing a functional split in C-RAN the parallel transmission of packets (redundancy/duplication) is allowed based on an agreed functional split, which may be one of the Options 1 to 8.

The split options are now explained in more detail. The split options (O3, O5, O7) which split current layers into high and low processing part, may have a higher influence on the protocol design of parallel transmission (redundancy or duplication) in accordance with the present invention:

Option 1 (1A-like split)
The function split in this option is similar as 1A architecture in dual connectivity (DC). RRC is in the central unit. PDCP, RLC, MAC, physical layer and RF are in the distributed unit.

Option 2 (3C-like split)
The function split in this option is similar as 3C architecture in DC. RRC, PDCP are in the central unit. RLC, MAC, physical layer and RF are in the distributed unit.

Option 3 (intra RLC split)
Low RLC (partial function of RLC), MAC, physical layer and RF are in distributed unit. PDCP and high RLC (the other partial function of RLC) are in the central unit.
This option allows two split approaches based on real-time or non-real-time requirements, namely the split option O3-1 (a split based on ARQ), or split option O3-2 (a split based on TX RLC and RX RLC).

Option 4 (RLC-MAC split)
MAC, physical layer and RF are in distributed unit. PDCP and RLC are in the central unit.

Option 5 (intra MAC split) RF, physical layer and some part the MAC layer (e.g. HARQ) are in the distributed unit. Upper layer is in the central unit.

Option 6 (MAC-PHY split) Physical layer and RF are in the distributed unit. Upper layers are in the central unit.

Option 7 (intra PHY split)
Part of physical layer function and RF are in the distributed unit. Upper layers are in the central unit.
This option allows three split approaches:
1. O7-1: In the UL, FFT, CP removal and possibly PRACH filtering functions reside in the DU, the rest of PHY functions reside in the CU. The details of the meaning of PRACH filtering have to be defined. In the DL, iFFT and CP addition functions reside in the DU, the rest of PHY functions reside in the CU.
2. O7-2: In the UL, FFT, CP removal, resource de-mapping and possibly pre-filtering functions reside in the DU, the rest of PHY functions reside in the CU. The details of the meaning of pre-filtering have to be defined. In the DL, iFFT, CP addition, resource mapping and precoding functions reside in the DU, the rest of PHY functions reside in the CU.
3. O7-3: Only the encoder resides in the CU, and the rest of PHY functions reside in the DU.

Option 8 (PHY-RF split)
RF functionality is in the distributed unit and upper layer are in the central unit, e.g. like the CPRI or OBSAI interface used in LTE networks.

Dependent on a selected split option of the radio access network (RAN) protocol stack the plurality of different versions of the data packet are provided by the central baseband unit or by one or more of the plurality of distributed units.

Uplink Packet Redundancy/Duplication Using DCI Grant Transmitted Via PDCCH

In the following, embodiments will be described regarding the uplink packet redundancy/duplication.

In a similar way as the base station may decide for the downlink packet redundancy/duplication, it may also decide for an uplink packet redundancy/duplication. The base station may send an indication to the UE to send different versions of an uplink packet via different uplink physical resources towards the random access network, for example, towards the base station.

Instead of sending multiple uplink grants, a single PDCCH uplink grant may trigger the transmission on the multiple physical resources for the uplink transition. The control information for the uplink may be derived from the uplink grant, in case the same parameters are used for the different physical resources, or it may be derived from a previous RRC pre-configuration that may be applied for the different physical resources. The RRC protocol may provide different SPS configurations for different resources. This configuration may not only include the exact resource allocation in terms of PRBs, but also complete RRC configuration sets as described above.

A single PDCCH uplink grant supporting packet redundancy/duplication may enable a UE to derive all the transmission parameters that may be used for transmitting on multiple physical resources in the uplink. In accordance with embodiments, certain parameters may remain dynamic and may be included in the PDCCH. For example, if there is an independent link adaption, two transport formats/coding modulation schemes may be signaled within the PDCCH uplink grant for a packet redundancy/duplication regarding the two different physical resources. Each physical resource may use frequency hopping using its own pre-defined hopping sequences, the resources of the second link may be derived implicitly by the resources of the first link, for example, by means of a relative offset or some predefined resource mapping.

In accordance with this embodiment, control channel overhead associated with uplink grants may be saved and, in addition with further embodiments, intelligent decoding at the receiver may be possible. Besides the separate decoding of each transmission, the uplink receive signal may also be combined at the base station. Examples are, like above, to use a single HARQ process for the soft-combining or to use a maximum ratio combining between the different receive signals representing the different versions of the uplink packet. In case of different links for dual connectivity, quantized soft bits of the received signal may be passed from the UE to the receiver.

Uplink UE Processing of Packet Redundancy/Duplication

In accordance with embodiments, the inventive packet redundancy/duplication approach, which has been described above with regard to the downlink, is equally applicable for an uplink transmission.

The UE may receive one or multiple PDCCH grants that allow the UE to transmit data in the uplink on multiple physical resources in a coordinated way. The PDSCH uplink transmissions may be separately encoded by the UE and decoded at the base station in a combined way. If the same or a similar format is used in the uplink for the packet redundancy/duplication, the UE processing may simplified by a joint physical layer processing chain. Even if multiple transmissions on different physical resources are done, a single encoding process may provide energy savings and UE complexity savings.

Figure 20B:
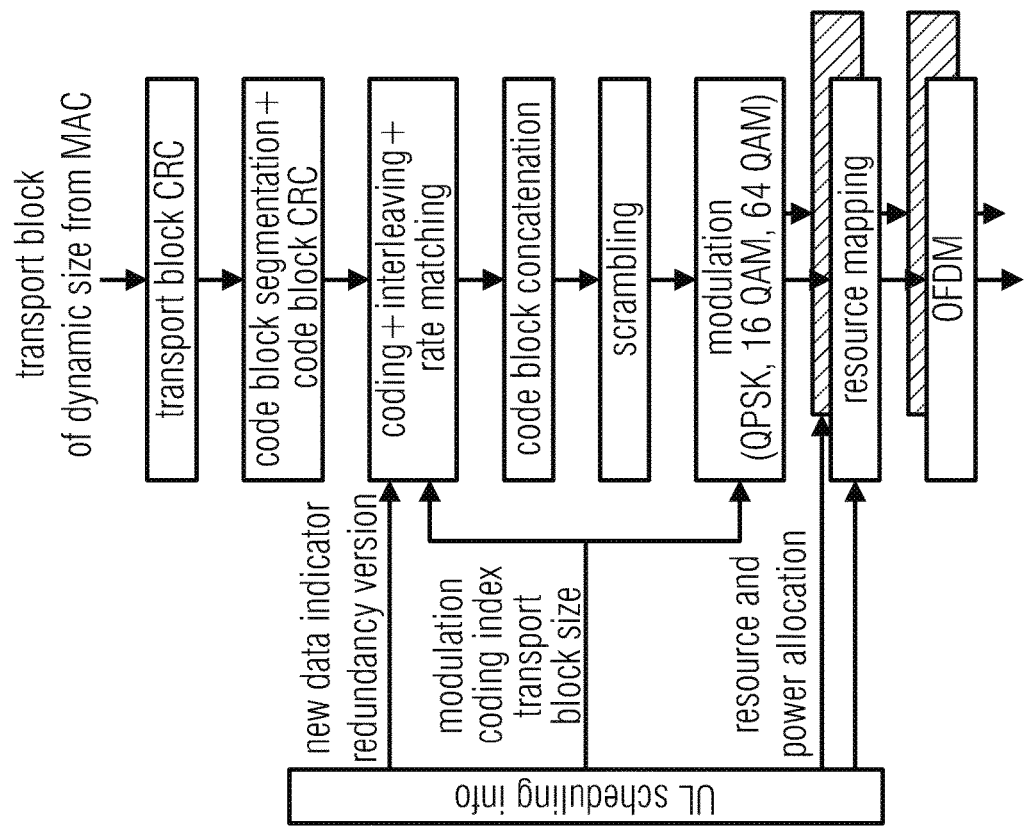
Figure 20A:
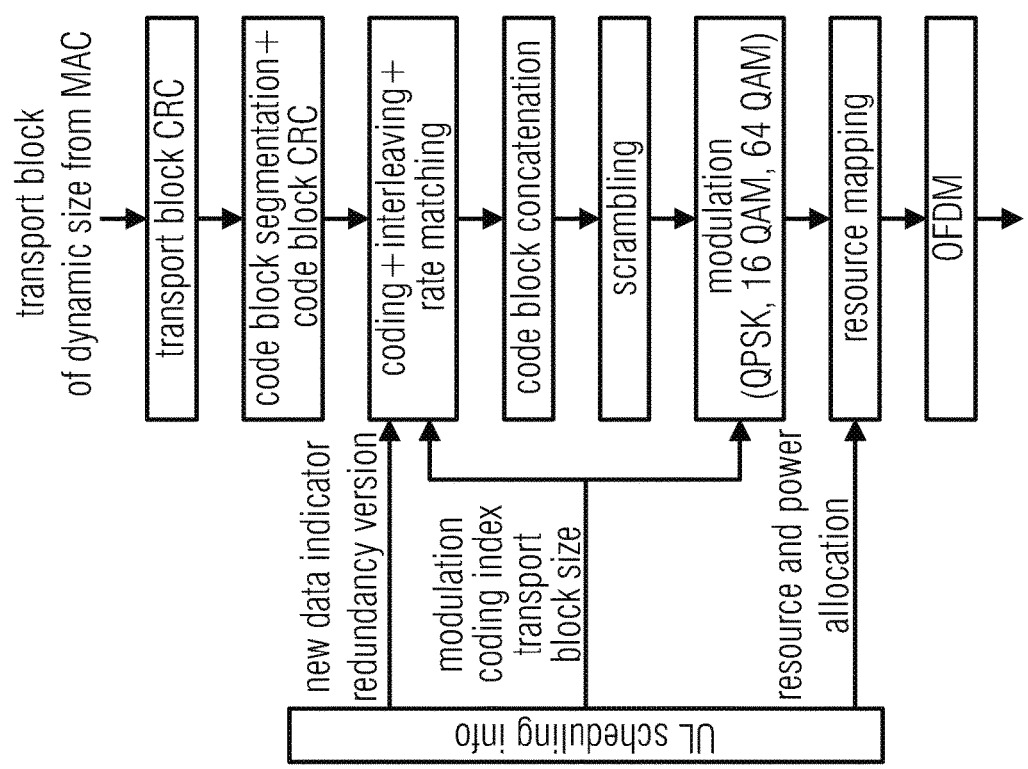

FIGS. 20A-B show a physical layer processing chain, wherein FIG. 20A shows single processing chain to be done in parallel for each data transmission, and FIG. 20B shows single processing chain to be done for shared processing chain for multiple data transmission in accordance with embodiments of the present invention. From the top of the respective chains, the transport blocks are delivered by the MAC layer to the physical layer and will be processed step by step. Due to link adaption there may be an adaptive coding, an adaptive modulation and an adaptive MIMO. The exact parameterization of the signal processing steps may be done by the base station scheduler, and the scheduling decision may be made by the base station which signals the decisions via the PDCCH uplink grant. The respective parameters are given along with the packets to the physical layer. In accordance with embodiments of the present invention, the same parameters are used for the multiple physical resources so that the physical layer processing complexity may be reduced significantly. For example, when considering LTE there may be a single cyclic redundancy check (CRC) calculation. Depending on the characteristics of the different transmissions, for example, segmentation, coding, interleaving, concatenation, scrambling, modulation and the like, may all be the same for the different links and may be performed only once although there are multiple physical transmission. This is depicted schematically in FIG. 20B showing the just mentioned processing steps to be performed only once, and the inventive redundancy/duplication process is achieved by the resource mappings. In other words, after modulation, the same protected, coded modulated scrambled URLLC data may be mapped to multiple physical resources that are then OFDM modulated.

In case the second physical resource is from a different RAT, not only the resource mapping and the access technology may be different, but also the common processing. For example, the different RATs may use different coding schemes. For example, 5G/NR may support LDPC and polar codes, while LTE is based on turbo encoding.

In case of uplink data transmissions, this may apply only for the uplink data channel, for example, the physical uplink shared channel (PUSCH). Since the uplink grant is received from the base station, there is only decoding for the PDCCH control channel and UE. Nevertheless, packet redundancy/duplication may also be extended to sidelinks. A sidelink of the UE may transmit the PDCCH signaling on a side control channel (PSCCH). In case the same transmission format is used for the multiple links, the PSCCH processing chain may be simplified in a similar way as shown in FIGS. 20A-B by the joint processing and by mapping the same protected, encoded, modulated, scrambled control data to multiple physical resources. Different processing chains may be provided for control channels and data channels as different reliabilities may be used for the different channels and therefore also different coding, modulation and the like may be used. While the data channel may, for example, use LDPC codes, the control channel may use polar codes.

Uplink Time Synchronization for Packet Redundancy/Duplication

As described above, time synchronization is an important coordination parameter for the inventive packet redundancy/duplication approach. While for the downlink the transmission of multiple resources at the same time, for example, the same mini-slot, slot or subframe, may be advantageous, this may be more difficult to realize in the uplink due to the power limitations. For example, the maximum transmission power of the UE may be limited to 23 dBm in case of LTE. This limit is valid for all transmission, and in case there are multiple transmissions, this maximum transmit power needs to be split among all transmissions. The reduced power per physical resource may cause a decrease in the reception quality since the received Signal-to-Interference-Noise Ratio (SINR) decreases accordingly.

In accordance with embodiments of the present invention, the different transmissions for packet redundancy/duplication may be staggered (shifted) in time in the uplink. For example, in case of carrier aggregation the uplink signal of the different carriers may be time-synchronized so that, while a certain version of the packet on carrier #1 may be sent at a mini-slot, slot or subframe at the time index N, the another version of the packet may be sent on carrier #2 at mini-slot, slot or subframe at time index N+1. By staggering of the transmissions, the transmit power is not split among the two physical resources.

Figure 21:
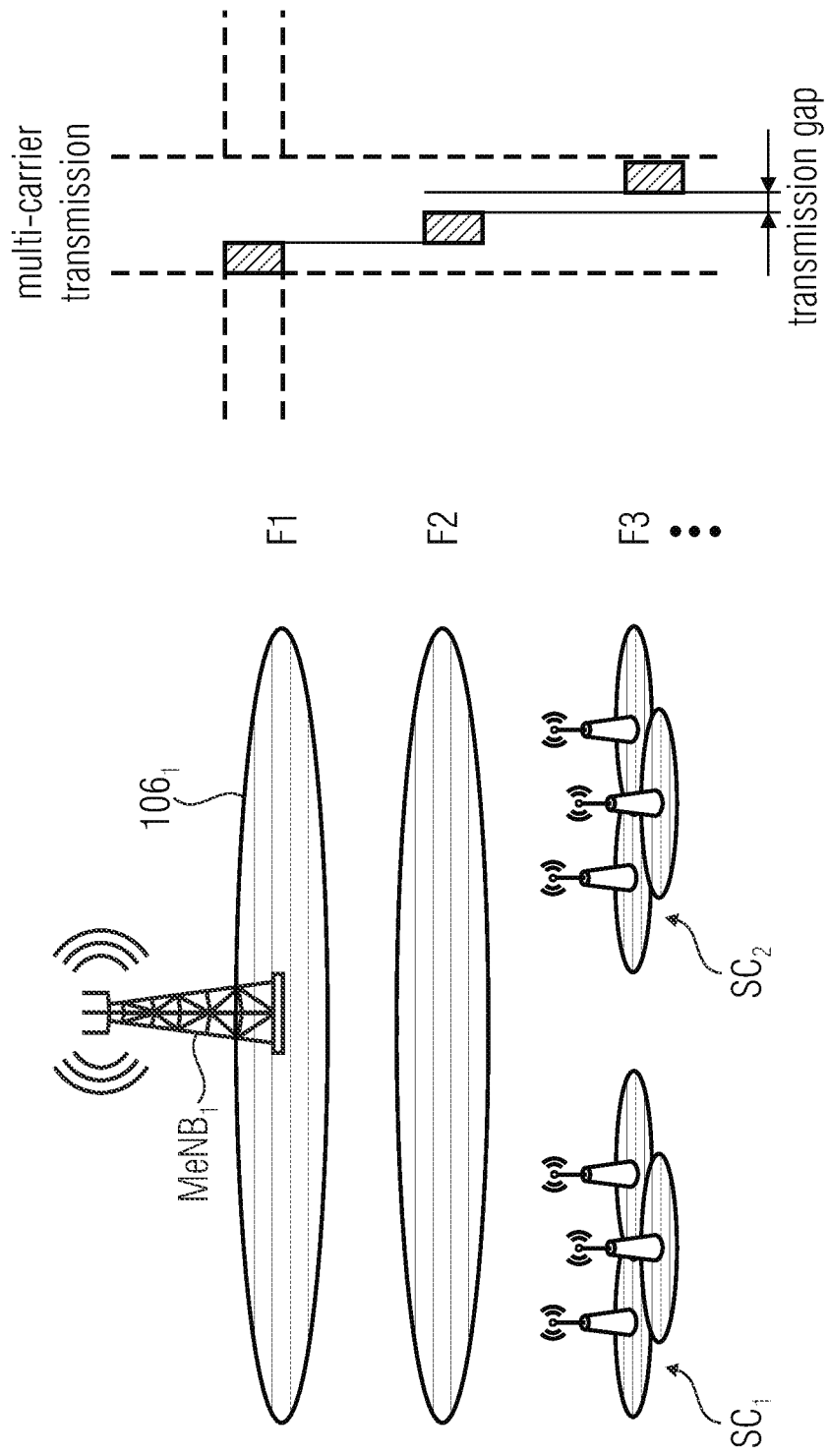
FIG. 21 shows a schematic representation of a time shifted uplink transmission on multiple frequencies (frequency diversity) and from multiple sites.

In the embodiments using dual connectivity, the two nodes may not be time-synchronized. Furthermore, dependent on the distance of the UE to the two sites, the propagation delay over the air may be different. Therefore, in case of dual connectivity, an additional gap in time may be introduced between the two transmissions of the different versions of the data packet on the different physical resources. The UE may distinguish between the physical resources having the same timing and between physical resources having a different timing. For physical resources with different timing the transmission gap may be introduced to be frame and symbol aligned. This may also be used when the transmission point are time-aligned but involve different timing advance due to the propagation delay since they are at physically distant locations. It may be advantageous to transmit first on carriers of the same timing without transmission gap, for example, a master cell group using carrier aggregation, and to then move to another link/site with a transmission gap and to transmit again on these resources with the same timing without transmission gap. This avoids adding multiple transmission gaps. FIG. 21 shows a schematic representation of time shifted uplink transmissions on multiple frequencies (frequency diversity) and using multiple sites (spatial diversity). A macrocell $106_1$ includes the macrocell base station $MeNB_1$ as well as a plurality of small cell groups $SC_1$ and $SC_2$. The macrocell base station $MeNB_1$ may apply carrier aggregation and transmit to a UE, without a transmission gap, while a transmission gap is introduced when transmitting via the secondary cells $SC_1$, $SC_2$, due to the spatial distance from the macrocell base station $MeNB_1$.

In accordance with an embodiment, the UE may start a staggered transmission of the different versions of the data packet in time, instead of in frequency or space, in case the UE is in a power limited situation. In other words, in case the transmission power is not sufficient for all links to be used for the inventive packet redundancy/duplication approach, the UE may start shifting the transmissions on different physical resources in time.

Autonomous Mode

In the embodiments described so far, a base station scheduled mode was used. The base station provides to the UE a semi-static RRC configuration and/or makes scheduling decisions that are communicated to the UE via MAC CE or PDCCH uplink grants.

The base station may not be fully aware of the conditions are the UE, such as available links, carriers, UE speed, transmission power, interference, signal thresholds and the like. The UE may perform some measurements and report the measurement results to the base station on the basis of which the base station may make a decision. This may cause signaling overhead, may not be accurate, and the measurement results may be reported with a delay. Therefore, in accordance with embodiments, the decision about applying the inventive packet redundancy/duplication and approach the amount of redundancy/duplication may be done autonomously by the UE or autonomously within a range configured by the base station. This may reduce the delay for bursty traffic that is not predictable as, in the autonomous mode, the UE does not need to send any scheduling request to the base station and does not have to wait for the grant.

The base station may configure the UE by an appropriate control signaling if it is allowed to use the autonomous mode or not. When operating in the autonomous mode, resources of the various carriers/links need to be reserved, for example, by providing SPS configurations or a non-orthogonal transmission may be used, for example, on the random access channel with some data capabilities or another grant-free access may be applied. The use of the autonomous mode may be allowed based on configured thresholds of the UE signal strength measurements so that, for example, at the cell edge or even when out of coverage, a grant-free non-orthogonal access may be less harmful to other users controlled by the base station. The resource selection algorithms in the UE may be configured to avoid collisions with other UEs that selected the same resources. The collision prevention may be done beforehand to avoid adding any delays during the transmission.

In the autonomous mode, not every decision may be made by the UE, but the UE's decisions may be limited in a parameter range provided by the base station. For example, the base station may configure signal strength levels, and the UE will measure the reference symbols of the base station on the different links, to support the resource selection by the UE. In case there is a strong and reliable connection to the base station, the link quality may be sufficient even for a URLLC service and in this case, the UE may decide to not apply the inventive packet redundancy/duplication approach. However, if the UE is at the cell edge between cells, potentially with significant interference from the neighboring cell, the inventive packet redundancy/duplication approach may be used to increase the reliability to a desired level. Based on thresholds configured by the base station, the UE may decide to use more or less packet redundancy, i.e., to send only one redundant version or a plurality of redundant versions. The UE may also perform short and/or long term measurements on the physical resources to be used for the transmissions.

Besides the signal measurements, also the distance of the UE from the base station may be a criterion for the decision whether the inventive packet redundancy/duplication approach is to be applied or not. The distance may be derived by path loss measurements, by a UE timing advance or by other means, such as GPS.

In accordance with embodiments, a handover may be realized as a zero delay handover which means that the second link will be established before the first link is removed. In this case, there are at least two links to two base stations available, and the UE may recognize this and use, during the handover, the inventive packet redundancy/duplication approach. This may also be applied to intra-frequency, inter-frequency, inter-RAT and even inter-system (3GPP and non-3GPP air interfaces) handovers.

Delay critical data, such as packets or data provided by URLLC services, may occur for vehicle-to-everything (V2X) and vehicle-to-vehicle (V2V) communications, and the decision to apply the inventive packet redundancy/duplication approach may depend on the UE speed. The UE speed may be categorized in different states, such as low, medium and high speed. Dependent on the speed of the UE, the inventive packet redundancy/duplication process may be used or not. The support of the inventive packet redundancy/duplication approach and respective thresholds/limits may be indicated by the base station, for example, when transmitting the system information block (SIB) for an URLLC service or for an URLLC slice. For example, if a UE is waiting at a crossing a ultra-reliable packet transmission may not be needed, while when moving at higher speed, the inventive packet redundancy/duplication approach may be needed. Also historical data may be considered. For example, in case the base station is aware that the UE had a certain number of cell changes/handovers in the past, the inventive packet redundancy/duplication approach may be considered as the UE is assumed to be moving.

The UE transmission power may be a criterion and in case the UE is close to its maximum power, also referred to as a power limited situation, the packet redundancy/duplication of multiple physical resources within a subframe, slot or mini-slot may not be possible anymore, and the UE may switch to time shifted resource allocations. In this case, either the base station monitors the UE signal within a window anyway or it has been informed by the UE about this power limited situation beforehand, for example, by a power headroom report. In case parallel transmission are not possible, in power limited situations, less reliable links may be dropped for the sake of the more reliable links. Furthermore, transmissions of non-delay critical data may be postponed. Such decisions may be made based on signal strength measurements performed by the UE.

RRC Diversity

In the embodiments described above, the redundancy/duplication techniques were applied to user data to be transmitted, for example, for a reliable data transmission of URLLC services. However, in accordance with further embodiments, the same mechanisms may be applied to make the control signaling, e.g., the RRC control signaling, faster and more reliable. This is also referred to as control channel or RRC diversity, RRC duplication/redundancy, or RRC control duplication/redundancy. For example, the RRC diversity may be useful for multi RAT connectivity when considering LTE and 5G/NR. While the 5G/NR link may be faster, the slower LTE link may be more reliable. RRC diversity may configure a specific signaling radio bearer. In case of power limited situations, the UE may fall back to the more reliable link. RRC diversity may also be limited to certain critical procedures such as radio link re-establishment or handover. In case of multi-RAT RRC diversity, the RRC messages itself may be access technology specific.

Uplink Feedback Signaling to Support Downlink Data Duplication

For the base station, the decision function for the inventive packet redundancy/duplication process, unless configured semi-statically, may be located in the PDCP layer or in the MAC Layer. In accordance with the following embodiments the decisions may be based on various criteria and/or information derived.

Joint HARQ Feedback

For each version of the data packet that has been transmitted, a HARQ feedback may be sent in the inverse direction. If there is a downlink data transmission, an acknowledgement ACK or non-acknowledgement NACK may be sent in the uplink within a specific time. After the coding a CRC check is used for error detection. For carrier aggregation as well as for dual connectivity, multi ACKs/NACKs may be sent for every version that is transmitted on any carrier or link. For MIMO spatial multiplexing ACKs/NACKs may be sent for each code word transmitted in the different spatial domains. The overhead from ACKs/NACKs increases with the increasing carriers, links, MIMO layers and so on. The respective ACKs/NACKs may be jointly encoded and transmitted as multi-ACKs/NACKs transmission.

To avoid signaling overhead, in accordance with embodiments, only a single ACKs/NACKs is generated for a version of the data packet, i.e., there is no ACKs/NACKs for the transmitted data on each link but only single NACK/ACK. This is advantageous as it will reduce the overhead. Further, the reliability of the NACK/ACK may increase since a stronger coding may be used for less information bits.

In accordance with another embodiment, the ACKs/NACKs signaling may contain additional information about which physical resource provided an ACK and which provided a NACK. Such information may be useful for the dynamic adaption of the packet redundancy/duplication decision, for example, after a number of successive NACKs, a certain non-reliable link may be removed from the set of available links to be used for the inventive process.

NACK Only Feedback

Since the number of block errors for ultra-reliable communications services may be extremely low, in accordance with embodiments, the HARQ feedback signaling may be limited to NACKs only. In case of a rare NACK transmission a stronger coding may be used, when compared to ACK/NACK messages sent for every transmission. After a NACK, a reconfiguration of the redundancy/duplication function may happen to make the transmission reliable again.

UE Suggestion for Data Duplication

In accordance with embodiments, the UE may suggest a set of physical resources for the downlink packet redundancy/duplication to the base station. The suggestion may be based on information provided by the UE to assist the base station with the redundancy/duplication process, e.g., information indicating the reliability of a certain transmission link. For example, a transmission link causing a substantial number of retransmissions may be considered not reliable and may be indicated to the base station as not being suited for the packet redundancy/duplication process.

The base station may eventually decide about applying the inventive packet redundancy/duplication approach based on the available information and may or may not follow the suggestion of the UE. The UE may suggest specific carriers and links for the transmission. The UE may also suggest a number of transmissions for a packet on the same or different resources.

Packet Redundancy/Duplication Using Carrier Aggregation

Figure 3:
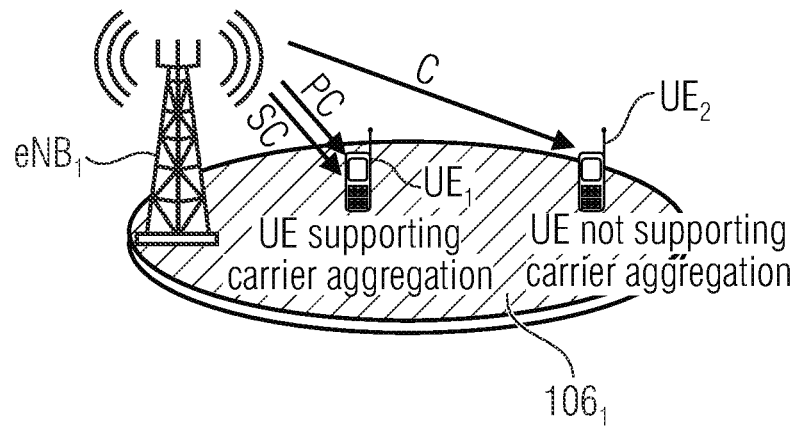
FIG. 3 shows a schematic representation for carrier aggregation in the cell of the system of FIG. 1.
Figure 4:
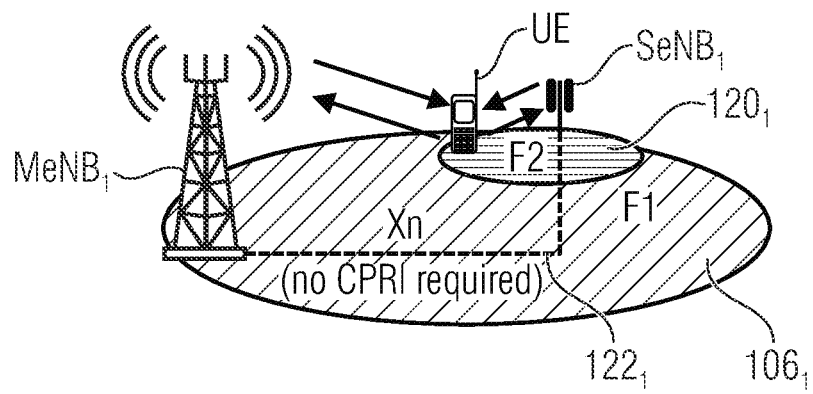
FIG. 4 shows a schematic representation for implementing dual connectivity in a network configuration as described with reference to FIG. 2.
Figure 5:
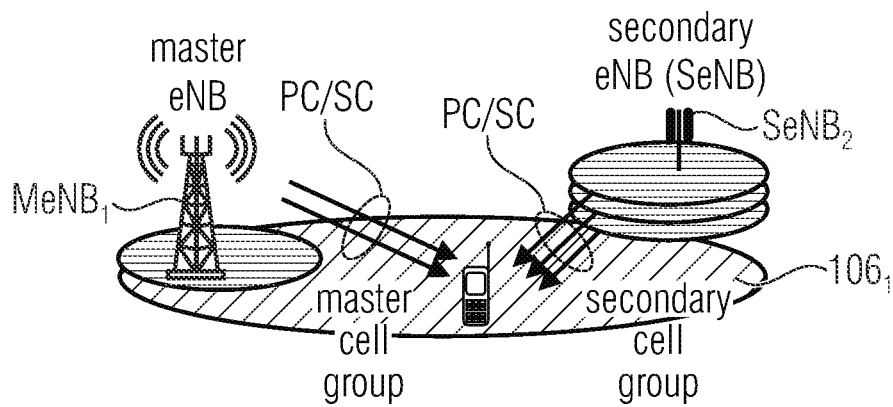
FIG. 5 schematically represents the combination of carrier aggregation with dual connectivity.
Figure 6C:
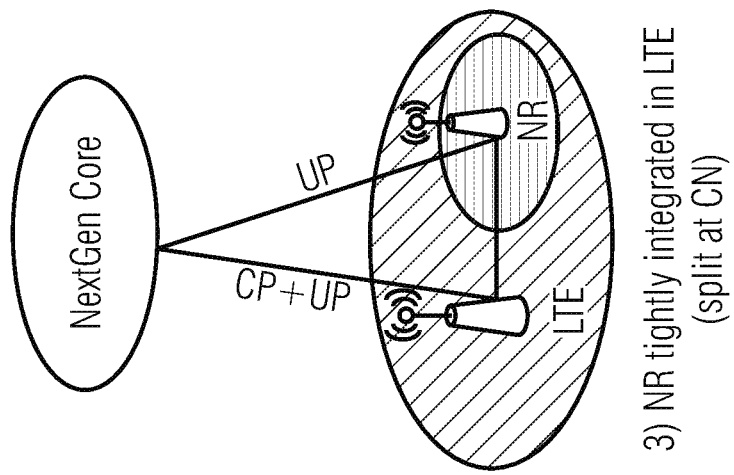
FIGS. 6A-C show schematic representations of examples for inter-RAT connectivity using LTE-base stations and 5G/NR base stations.
Figure 6B:
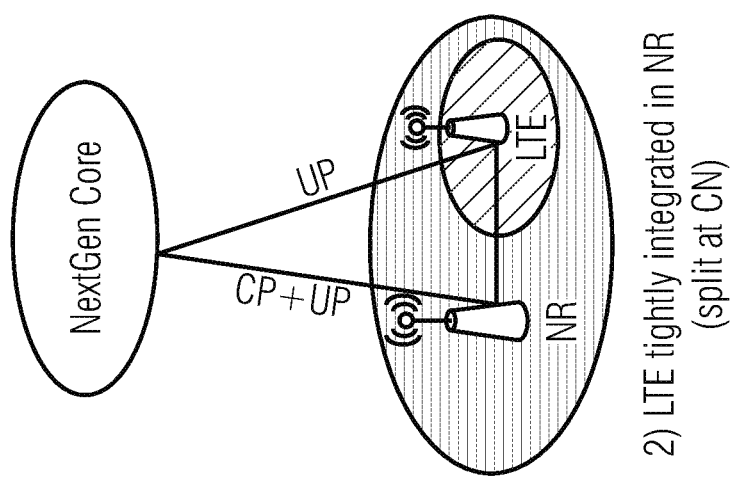
Figure 6A:
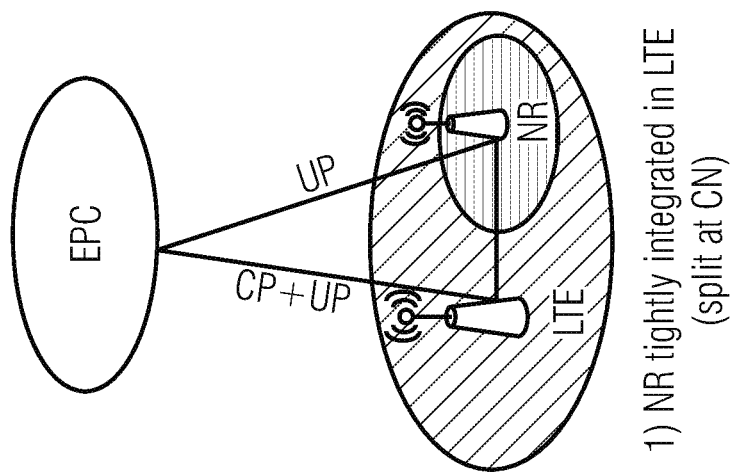
Figure 22:
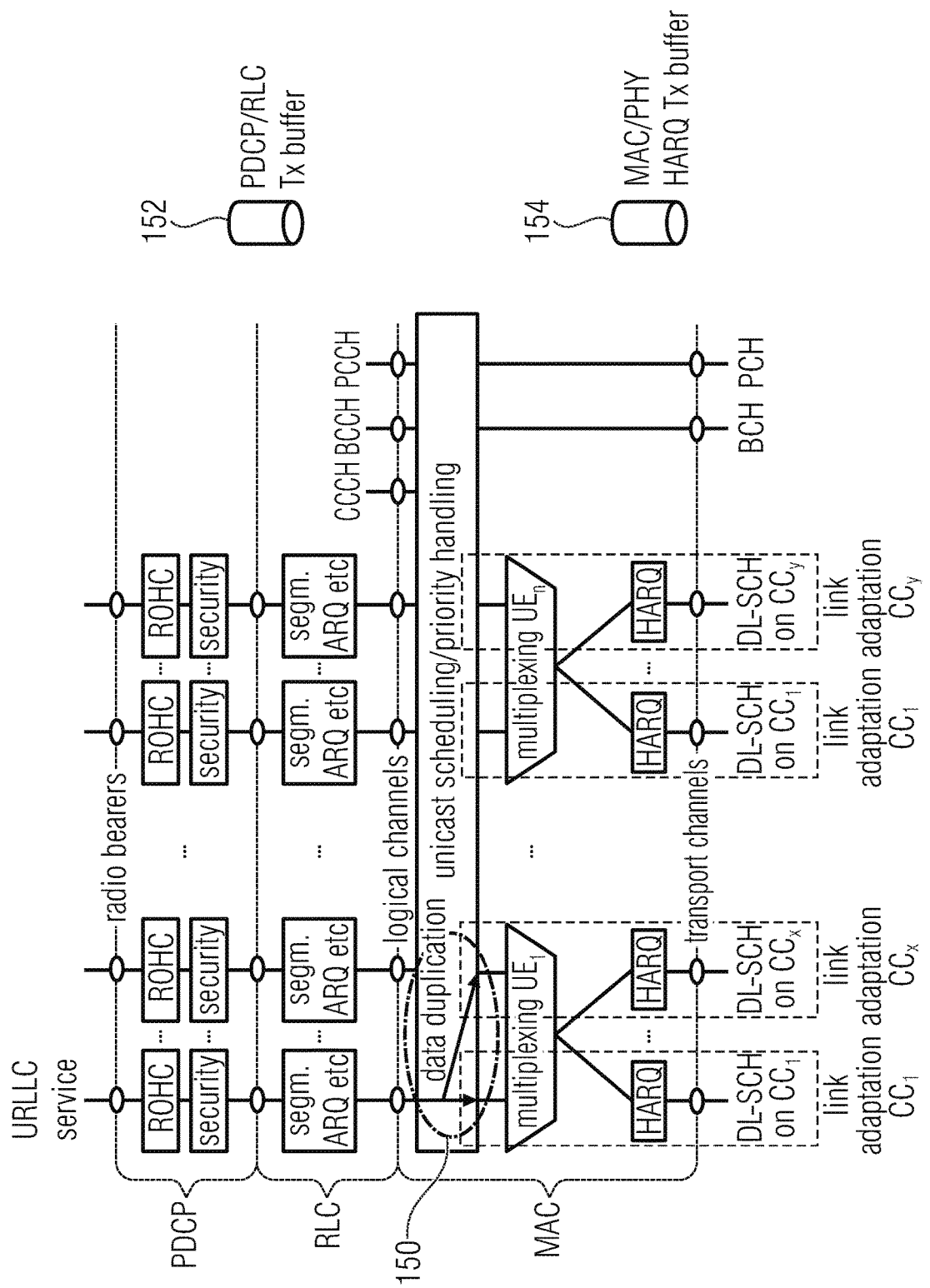
FIG. 22 shows an embodiment of a LTE downlink protocol stack for the implementation of the inventive packet redundancy/duplication approach using carrier aggregation.

In the following, embodiments of the inventive packet redundancy/duplication approach using carrier aggregation will be described. FIG. 22 shows an embodiment of the LTE downlink protocol stack for the implementation of the inventive packet redundancy/duplication approach using carrier aggregation. The protocol stack includes the PDCP layer, the RLC layer and the MAC layer. One of the radio bearers is associated with an URLLC service. The packet redundancy/duplication includes a packet duplication ate the MAC layer, as is schematically indicated at 150. The MAC layer receives single RLC packet data units (PDUs) from the logical channel which are associated with the URLLC service and for which a packet redundancy/duplication is indicated. The packet redundancy/duplication is performed by the MAC layer which duplicates the received PDU. The duplicated PDUs are send by the MAC layer towards multiple downlink shared channels (DL-SCH) on different component carriers (CC). One of the component carriers may be the primary carrier PCI and the other may be the secondary carrier SC shown in FIG. 3.

Based on the QoS profile and the MAC configuration obtained by the RRC layer, as described above, the MAC layer entity decides how to control the packet redundancy/duplication and how to distribute it over the plurality of secondary links so that, in accordance with further embodiments, additional component carriers may be used for the inventive packet redundancy/duplication approach.

In accordance with embodiments, the PDCP layer may provide for a transmission buffer 152 that buffers the incoming IP packets from the core network. The packets may be pre-processed before the actual scheduling process at the MAC layer. The pre-processing may include PDCP functions like header compression security and the generation of the PDCP layer headers (e.g. including a PDCP layer sequence number). Once the MAC layer schedules the transmission, data packets are taken from the PDCP layer and processed all the way through the protocol stack. Since the RLC layer may have a retransmission mode it may buffer the packets until they are acknowledged. FIG. 22 shows a corresponding buffer 154 that may be in the MAC layer. In accordance with other embodiments, the buffer 152 may be shared.

In the embodiment of FIG. 22, the inventive packet redundancy/duplication approach is indicated for one data radio bearer that serves an URLLC service on the basis of carrier aggregation. Based on the RRC configuration or based on scheduling triggers, the MAC layer provides for the redundancy of the packets which are transmitted via multiple component carriers of the same UE. The embodiment described with reference to FIG. 22 may implement all of the embodiments described earlier regarding improvements in the signaling for the implementation of the inventive redundancy/duplication process.

Packet Redundancy/Duplication Using Dual Connectivity

Figure 23:
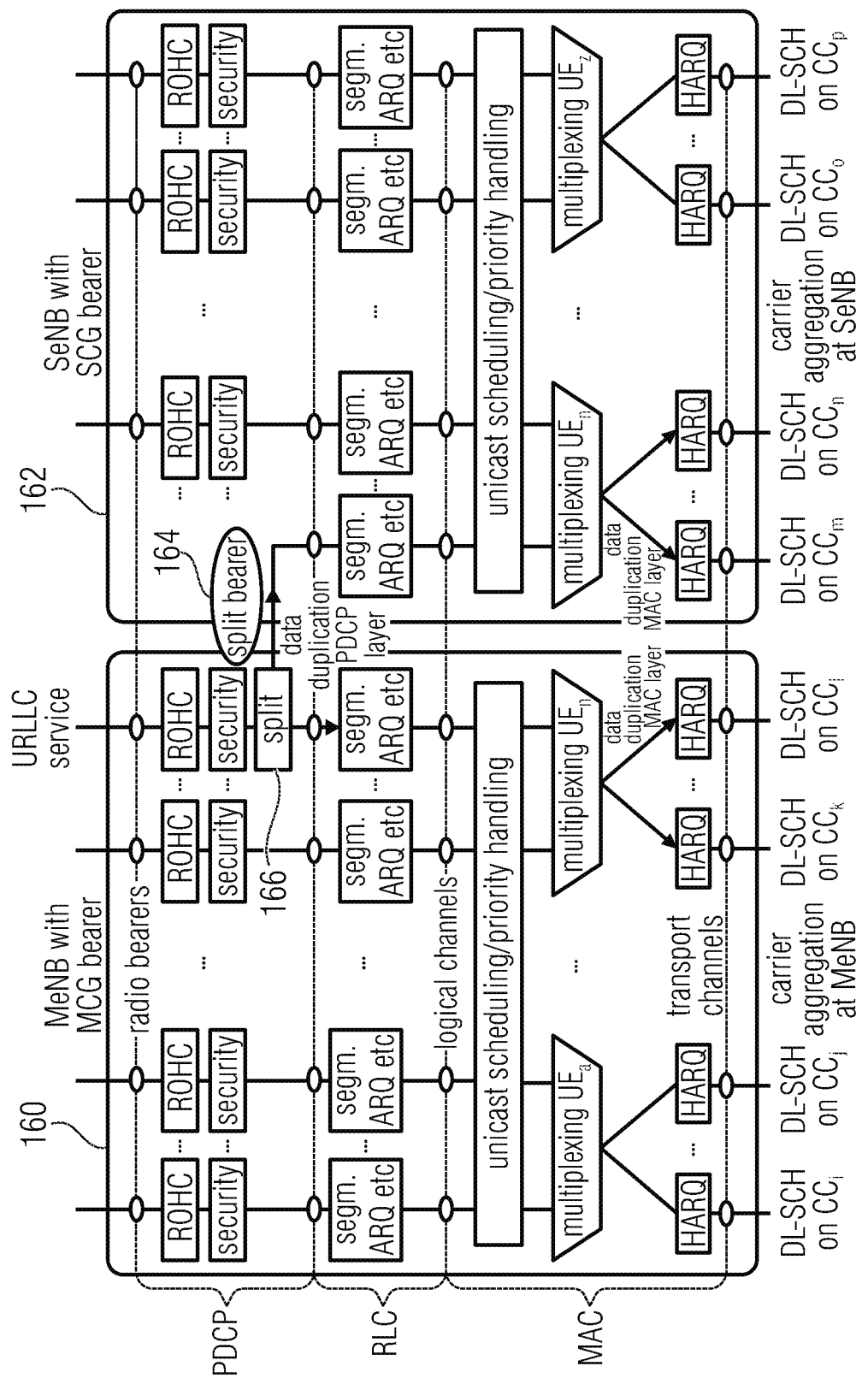
FIG. 23 shows an embodiment of a LTE downlink protocol stack for the implementation of the inventive packet redundancy/duplication approach using dual connectivity.

FIG. 23 shows an embodiment of a LTE downlink protocol stack for the implementation of the inventive packet redundancy/duplication approach using dual connectivity. In a similar way as FIG. 22, the downlink protocol stack is shown, now for dual connectivity. The split in accordance with dual connectivity is performed at the PDCP layer, other than in carrier aggregation, where it takes place at the MAC layer. There are different bearer types, namely the MeNB cell group bearer 160, the SeNB cell group bearer 162 and the split bearer 164. When compared to the conventional stack, the MeNB stack includes the additional split element 166 in the PDCP layer implementing an algorithm to adaptively forward packet data units via two links.

A PDU for an URLLC service is received at the MeNB and split at the PDCP layer to be forwarded to the SeNB so that it may be transmitted over separate physical resources. Thus, the transmission may be via multiple links, and, as in the embodiment of FIG. 22, the packet is duplicated.

In accordance with further embodiments, as is shown in FIG. 23, at the MAC layer one or more of the base stations may apply carrier aggregation so that an additional packet redundancy/duplication at the MAC layer is introduced. In accordance with other embodiments, no such additional carrier aggregation may be implemented at the MAC layer.

The above described embodiments regarding the signaling and processing within the protocol stack between the UE and the radio access network for implementing or controlling the inventive packet redundancy/duplication approach may also be implemented in the embodiment of FIG. 23.

The packet redundancy/duplication in accordance with the embodiments depicted in FIG. 22 and FIG. 23 includes transmitting the data packet and a duplication or copy thereof. The duplication/copy of the packet may be obtained by applying a HARQ process providing chase combining, however, without any retransmission request.

Further embodiments similar to the ones described with reference to FIG. 22 and FIG. 23, except that the packet is not duplicated but one or more redundant versions thereof are transmitted, will now be described.

FIG. 24A shows an embodiment of a LTE downlink protocol stack for the implementation of the inventive packet redundancy/duplication approach using dual connectivity wherein the inventive approach is implemented by a network coding 156 signaled over the MAC layer. As mentioned above, rather than sending one or more copies of the data packet, in addition to the data packet itself the other links may transmit one or more different redundant versions. At the MAC layer, following the multiplexing, the network coding 156 is introduced so as to provide different redundant versions $RV_1$ to $RV_4$ to be transmitted on respective component carriers. For example, on the PHY level a distributed incremental redundancy may be implemented for achieving link diversity. Erasure correction codes, such as Raptor, LDPC, LT, or network codes implemented on higher layers than the physical layer, may be used in addition to the PHY level. In this case, only a fraction of a transport block is transmitted over a physical link. A receiver needs to successfully decode at least e.g. 3 out of 4 links to be able to recover the whole code word. Each layer may carry another redundancy version and the UE needs to be aware which redundancy version is carried over which link. The UE may receive an explicit signaling of redundancy versions, or a fixed pattern may be used. For a potential HARQ, the RV versions may be shifted in a way to avoid as long as possible a duplication of the data. The number of RV versions depends on the implemented FEC scheme and on the puncturing mechanisms as used in the standard used for the communication. The first transmission may include a transmission of the data and parity information on the first link, and a first redundant version $RV_1$ on the second link. In case a retransmission is requested by the receiver, a second (HARQ) transmission may include a second redundancy version $RV_2$ on the first link, and a third redundancy version $RV_3$ on the second link. In case yet another retransmission is requested, the third (HARQ) transmission may transmit a redundancy version $RV_5$ on the first link, and the duplicated data and parity information on over the second link. Duplicating the packet is avoided as long as possible.

In accordance with embodiments, on the higher layers, erasure codes or network codes may be used in the MAC layer, the PDCP layer or the RLC layer to achieve incremental redundancy. The network codes are advantageous as a quasi-unlimited number of new redundancy versions may be generated dynamically in each link domain by combining of code words. The network code coefficients needed for decoding may be sent along with the data or may be explicitly signaled or derived from a fixed pattern.

Figure 24B:
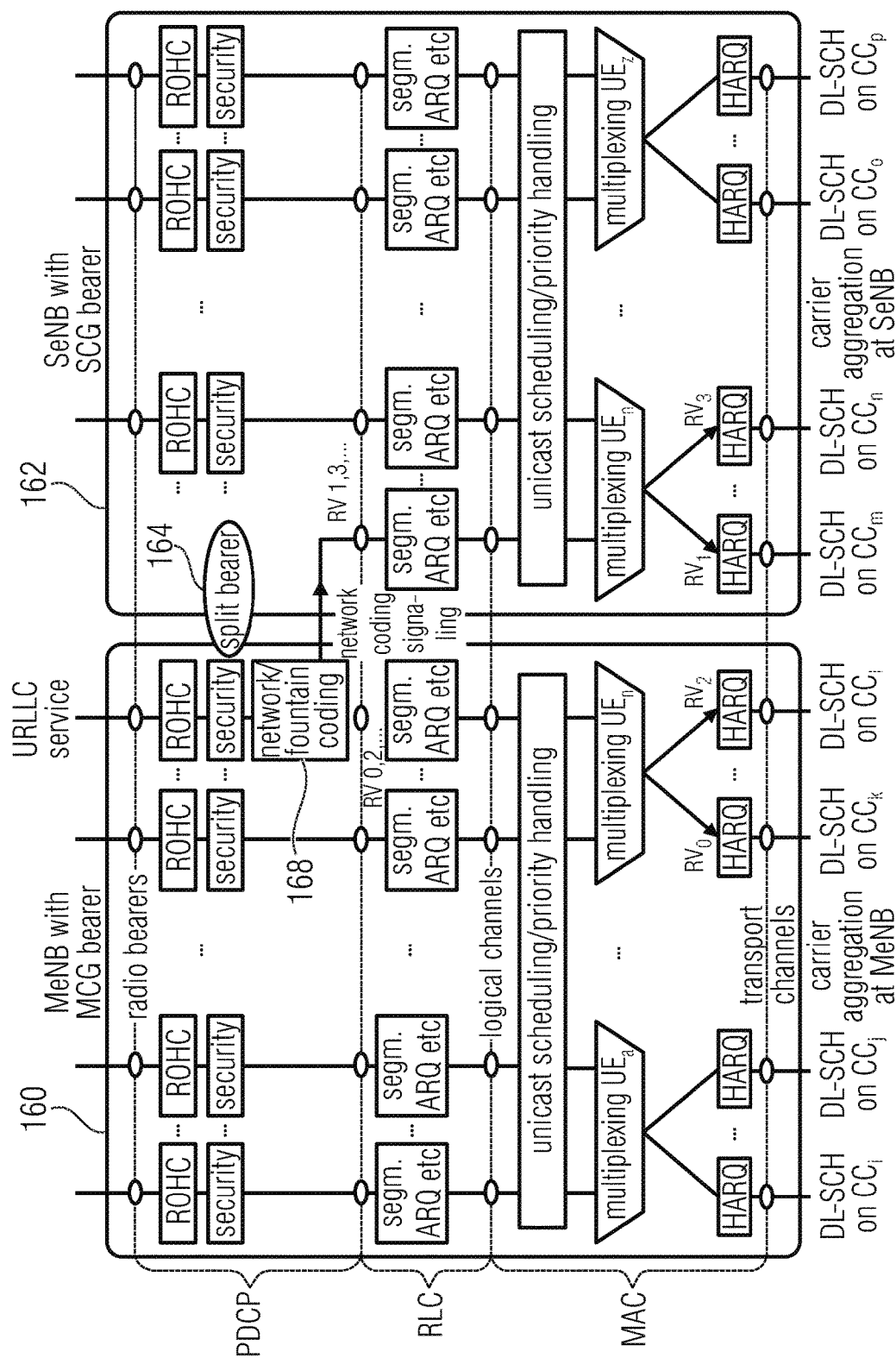
FIG. 24B shows an embodiment of a LTE downlink protocol stack for the implementation of the inventive packet redundancy/duplication approach using dual connectivity wherein the inventive approach is implemented by network coding on the PDCP layer.

FIG. 24B shows an embodiment of a LTE downlink protocol stack for the implementation of the inventive packet redundancy/duplication approach using dual connectivity wherein the inventive approach is implemented by network coding on higher layers, like the PDCP layer and is signaled across multiple base stations to achieve code diversity. In accordance with other embodiments, the network coding 168 may be performed above the PDCP layer. Like in the embodiment in FIG. 24A, the network coding—now performed at the PDCP layer—provides different redundant versions $RV_1$ to $RV_4$ that are distributed among the MeNB cell group bearer 160 and the SeNB cell group bearer 162 to be transmitted via their associated links. Like in the embodiment of FIG. 23, at the MAC layer one or more of the base stations carrier aggregation may be implemented so that an additional packet redundancy/duplication at the MAC layer is introduced.

Packet Redundancy/Duplication Using Inter RAT Connectivity

Embodiments of the inventive packet redundancy/duplication approach using inter RAT connectivity will be described. For a data duplication, usually, a split bearer may be used to send the different versions of the data packet via two links. Each link may be served by a different radio access technology and the split bearer may be configured by the master base station which, in accordance with embodiments, may be a LTE base station or a 5G/NR base station. FIG. 25 shows a schematic representation of an embodiment, similar to that in FIG. 23, using inter RAT connectivity.

Figure 25A:
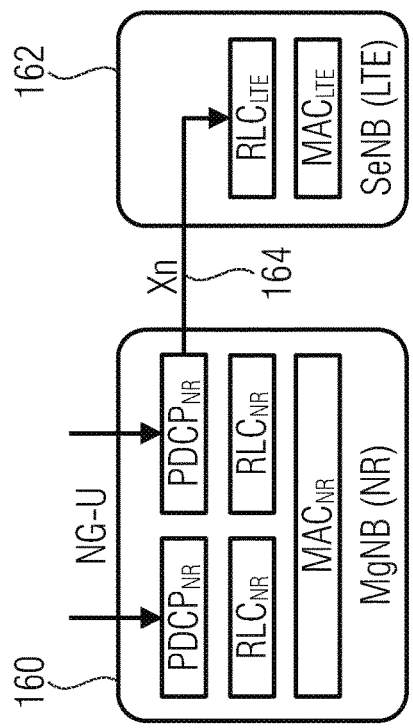
FIGS. 25A-B show a schematic representation of an embodiment, similar to that in FIG. 23, using inter RAT connectivity, wherein FIG. 25A show an embodiment in which the first bearer is a LTE master base station and the second bearer is a 5G/NR secondary base station, and wherein FIG. 25B show an embodiment in which the first bearer is a 5G/NR master base station and the second bearer is a LTE secondary base station.

FIG. 25A shows an embodiment in which the first bearer 160 is a LTE master base station and the second bearer 162 is a 5G/NR secondary base station. The LTE bearer 160 includes the split functionality within the PDCP layer so as to allow for the transmission of the different versions of the data packet to the 5G/NR bearer 162. The base stations are connected by an appropriate backhaul interface referred to as Xx/Xn, e.g. X2 interface in LTE.

Figure 25B:
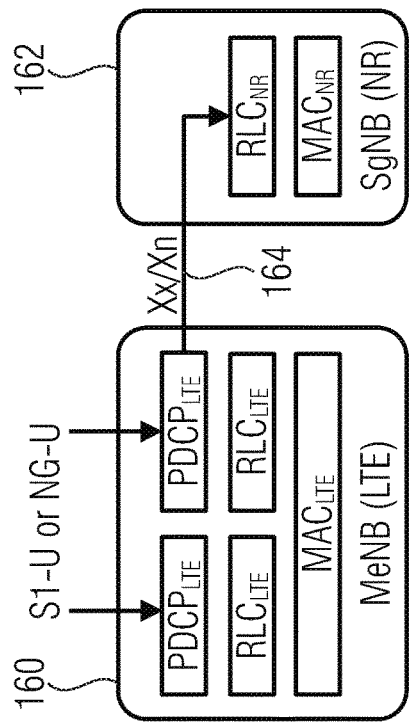

FIG. 25B shows an embodiment similar to the one of FIG. 25A, except that first bearer 160 is a 5G/NR master base station and the second bearer 162 is a LTE secondary base station.

Figure 26A:
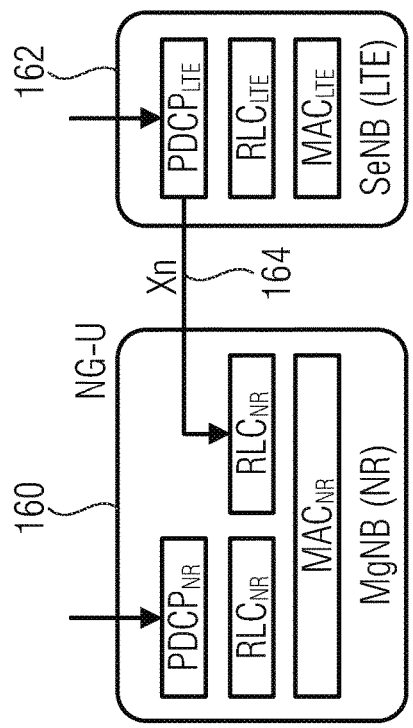
FIGS. 26A-B shows a schematic representation of an embodiment, similar to that in FIGS. 25A-B, using inter RAT connectivity, showing in FIG. 26A and FIG. 26B the respective secondary base stations including the split bearer for providing the master base station with the data for the parallel transmission.
Figure 26B:
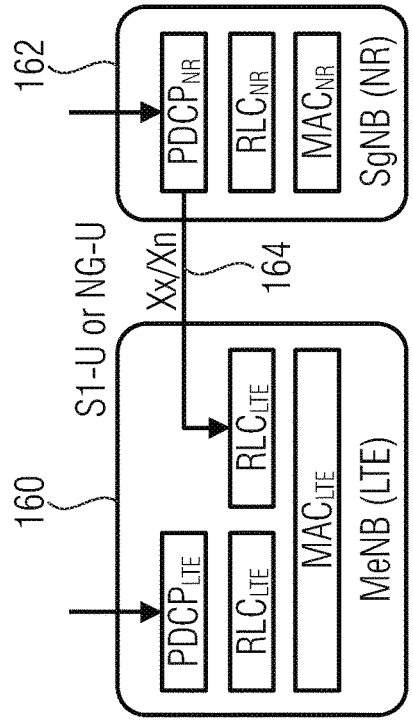

While FIGS. 25A-B show embodiments in which indicated the split bearer 164 is set up by the master base station 160, in accordance with other embodiments the split bearer may also be set up by the secondary base station 162, as is schematically represented in FIGS. 26A-B showing in FIG. 26A and FIG. 26B the respective secondary base stations 162 being either in accordance with 5G/NR or LTE and including the split bearer 164 for providing the master base station 160 with the data for the parallel transmission over the various links in accordance with the inventive packet redundancy/duplication process.

Thus, in accordance with the embodiments described above, the inventive packet redundancy/duplication approach may be implemented by providing a split bearer to send the different versions of the data packet via two or more links. The above described embodiments regarding the packet transmission and reception of multiple links in a coordinate way apply also to when implementing inter-RAT dual connectivity. In other words, like in the case of dual connectivity, the PDCP layer not only submits the different versions of the data packet via two links which operate independently of each other but the actual transmission on the multiple links will be coordinated in time. The transmission may be synchronized, when possible, and the receive signal between the different radio access technologies may be combined and joint coding may be applied.

Packet Redundancy/Duplication Using MBSFN

Figure 27:
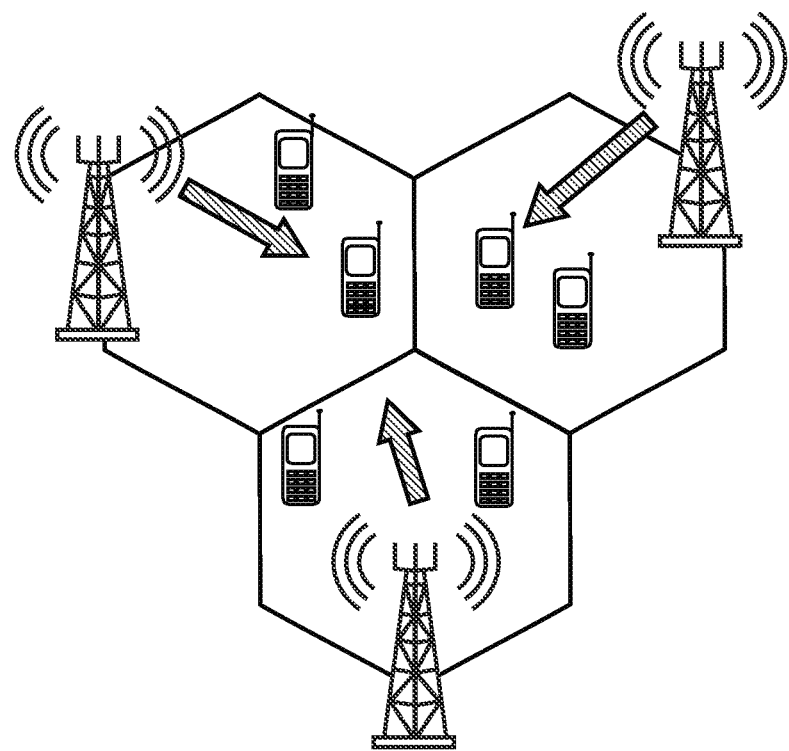
FIG. 27 shows a schematic of an embodiment of the present invention for transmitting the packet and its redundant versions using a MBSFN.

In accordance with further embodiments, the inventive packet redundancy/duplication process may be implemented using an MBSFN transmission. For example, in DVB-T broadcast or MBMS multi-cast transmissions that are known in UMTS and LTE networks, a single frequency network (SFN) may be used. In such a case, the same signal is sent from multiple base stations which may be synchronized via a GPS. As is shown in FIG. 27 when using MBSFN, the base stations operate from different locations and the signals are combined at the UE. The MBSFN transmission is advantageous as the signal quality is improved significantly as, instead of forming the basis for an inter-cell interference (ICI), the signals from the multiple transmitters may be combined, thereby increasing the SINR ratio significantly. In accordance with embodiments of the present invention, the different versions of the data packet may be transmitted using the MBSFN transmission.

Packet Redundancy/Duplication Using FeD2D

In accordance with other embodiments, FeD2D relaying may be used for implementing the inventive packet redundancy/duplication approach. For example, in a personal IoT scenario or in a coverage extension scenario, a relay UE may be connected to the cellular interface and act as a companion device for other remote UEs, for example a remote UE1 and remote UE2. The remote UEs may be connected via LTE, for example using MTC, eMTC or NB-IoT variants, or via 5G/NR to the relay UE.

Figure 28:
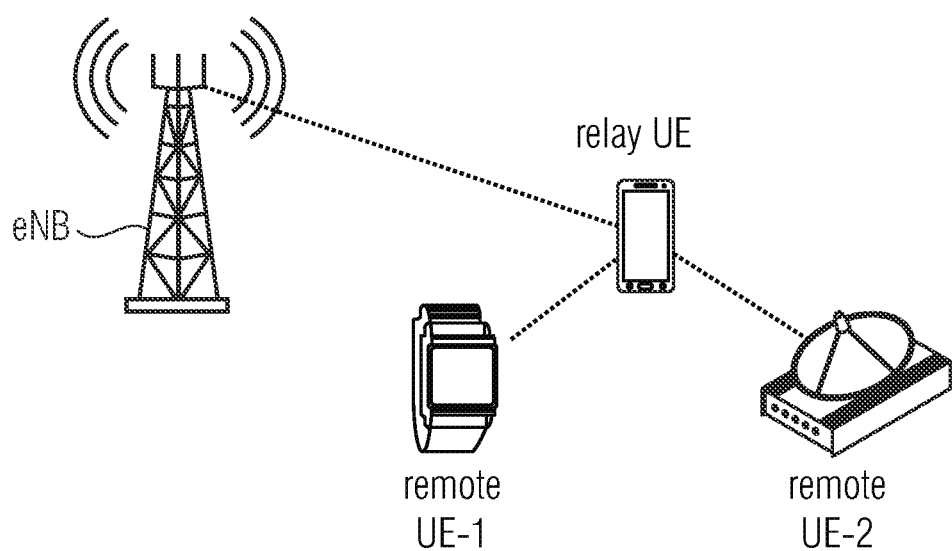
FIG. 28 shows a schematic of an embodiment of the present invention using FeD2D relaying for implementing the inventive packet redundancy/duplication approach.

FIG. 28 shows a schematic of an embodiment of the present invention using FeD2D relaying for implementing the inventive packet redundancy/duplication approach. A UE acts as a relay and forwards data to other remote devices, for example IoT devices or wearables. The remote devices may also have a connection to the base station. In accordance with embodiments, the base station may perform a duplication and relay duplicated packets over the relay UE to increase the redundancy. The remote devices may either decode the signals received from the base station, the relay UE or both. In such a scenario, the base station may send one version of the packet and the relay may send the another versions thereof. In accordance with other embodiments, the relay may transcode or just relay received data packets from the base station and perform the packet redundancy/duplication on the relay-to-remote-UE links. In case transcoding is used, the relay UE may transmit a more compact version of the data to the remote UE.

Packet Duplication for Direct Communication on a Sidelink

In the following, further embodiments for the inventive packet redundancy/duplication approach are described in the context of a direct communication on a sidelink.

Figure 29A:
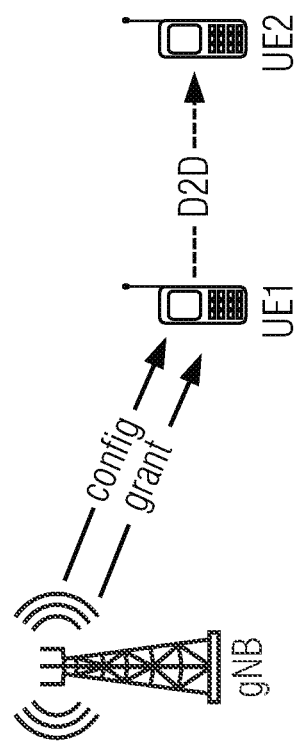
Figure 29B:
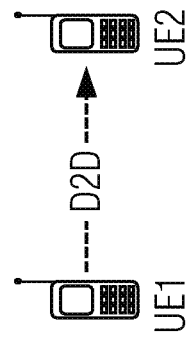

FIGS. 29A-B schematically show a transmissions between two UEs using a direct communication on a sidelink. FIG. 29A shows that the transmission between the two UEs is controlled by a base station scheduler. In the base station scheduled mode, as usual, the configuration may be provided by RRC signaling while the scheduling decisions are communicated via a PDCCH resource allocation/grant. Once the grant is received, the UE is allowed to use a direct transmission to the other UEs. FIG. 29B shows that the transmission between the two UEs is controlled autonomously by the UE. The autonomous mode may be used in an out-of-coverage scenario or in case very delay critical data needs to be transmitted and in case the centralized approach via the base station scheduler is too slow. In the autonomous mode, the scheduling decision is done independently by the UE based on pre-configured parameters, based on UE measurements and/or based on scheduling information from the cluster head. The direct communication indicated in FIGS. 29A-B as device-to-device (D2D) transmission may include a PSCCH sidelink control channel indicating the location and transmission parameters to the receivers and a PSSCH sidelink shared data channel with the actual data transmission.

Figure 30A:
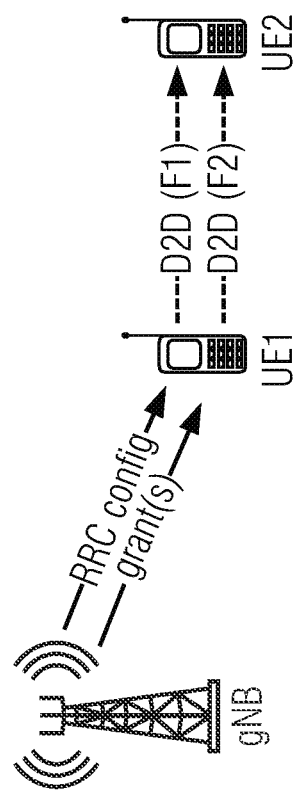
Figure 30B:
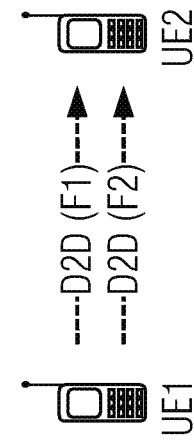

In accordance with embodiments, packet redundancy/duplication is enabled based on a packet-per-packet indication for a direct communication between two or more UEs. FIGS. 30A-B schematically shows implementing the packet redundancy/duplication transmissions directly between two UEs using a direct communication on a sidelink. FIG. 30A shows that the transmission between the two UEs is controlled by a base station scheduler, and FIG. 30B shows that the transmission between the two UEs is controlled autonomously by the UE. The UE transmits the different versions of the data packet to the target UE on different frequencies, as is shown in FIGS. 30A-B. The UEs are linked via a plurality of transmission links (different frequencies) to allow for the transmission of the different versions of the data packet on the different carriers.

The inventive packet redundancy/duplication approach allowing for packet redundancy/duplication on the sidelink is advantageous as multiple physical sidelink resources used for the transmission make the direct communication more reliable, for example for a URLLC communication. In a simple embodiment, as the one depicted in FIGS. 30A-B, two frequencies are used for D2D transmissions.

In the scheduled mode, as depicted in FIG. 30A, the base station grants may be duplicated for the frequency F1 and F2 so that a single grant may schedule multiple sidelink transmissions. The grant issued by the base station may also activate a semi-persistent scheduling (SPS) resource allocation or a grant free transmission. In such a scenario, the UE may transit data in accordance with the inventive packet redundancy/duplication approach within the pre-configured resources. This is advantageous as it does not require to send a grant for each D2D transmission and allows the schedule mode to be used even for very delay critical data. In case of semi-persistent scheduling (SPS) irregular periodic resource(s) may be configured to be used by the UE until a reconfiguration takes place or the resources are released. The base station may provide for the SPS configuration decision based on sensing measurements that it previously received from the UE. Once the UE has been configured by the base station and once data is available in the UE, the UE may use the pre-assigned resources for implementing the inventive packet redundancy/duplication approach on the different carriers.

In case the link between the base station and the UE1 in FIGS. 30A-B is considered reliable, the inventive packet redundancy/duplication approach may not be required on this link and a single grant maybe sufficient. Nevertheless, the UE2 may not be within the coverage range of the base station so that the UE1 servers as a relay and may use the inventive packet redundancy/duplication approach for the D2D link. In accordance with embodiments, the inventive packet redundancy/duplication approach via the D2D link used in vehicle-to-vehicle scenarios, especially scenarios concerning autonomous driving. Depending on the robustness of each individual link, the use of the inventive packet redundancy/duplication approach may be decided.

The technique described above with reference to FIGS. 30A-B may also be used for multi-hop transmissions, i.e., using the UE2 as a further relay for a connection via different carriers to a third UE. The above described direct communication and also the above embodiments for the packet redundancy/duplication may be applied, including the techniques for combining the control signaling as well as the data signaling which may be applied to the PSCCH sidelink control channel and the PSSCH sidelink data channel. Also, in accordance with embodiments, a single PDCCH grant may trigger multiple sidelink transmissions and, further, a single UE processing chain may be used and transmissions may be time shifted on different resources or may be repeated on the same resource. The UE may be configured to autonomously select resources or it may be in a UE base schedule mode. Also the above described UE feedback signaling may be applied.

In accordance with further embodiments, the physical resources for the inventive packet redundancy/application processes may include a geographical resource selection algorithm to select resources based on zones where the UE is currently located. This is advantageous in that physical resources may be based on UE location which may reduce the interference level or the collisions while still allowing for a spatial reuse of resources. In the above described the scheduled mode (see FIG. 30A) the indication for packet redundancy/duplication on a D2D link may be semi-statically configured by a previous RRC signaling or may be dynamically send in each PDCCH resource allocation. While the RRC signaling may save bits on the PDCCH resource allocation, which is sent on a regular basis, the dynamic control by PDCCH downlink control information provides for an increased flexibility at the expense of signaling overhead.

The different physical resources might be transported on different antennas, different beams or even use different RATs. Different RATs may be LTE, 5G/NR, but may also include LTE V2X and IEEE 802.11p DSRC.

In accordance with further embodiments, instead of implementing a complex QoS framework, a direct mode QoS may be based on a packet per packet QoS indication. The respective QoS information may be passed along with the respective data packet from a higher application layer down to the lower layer responsible for the radio transmission.

In accordance with embodiments, the packet redundancy/duplication process for the sidelink may be decided based on such packet per packet indication. This may be a simple packet per packet priority, for example priority (0, 1, 2, . . . 15), however, it may also be a more complex indication for each packet including a maximum allowed latency or a target block error rate. Upon receiving a packet with this indication from higher layer, the PDCP or the MAC layer may duplicate the packet or provide the redundant versions of the packet for transmission via different links or different access technologies. Depending on the packet per packet indication the responsible transmitting entity decides to transmit multiple versions of the packet on the two or more links in accordance with the inventive packet redundancy/duplication approach. For example, a packet with low reliability requirement or with a no redundancy/duplication indication might just be sent via a single frequency f1, while a packet which includes such high reliability requirement or a redundancy/duplication indication may be transmitted together with its redundant or duplicated versions over two frequencies. The level of redundancy/duplication as well as the distribution over the respective serving cells, links, carriers, transmission points, antennas or other physical resources for this packet per packet indication is up to the transmitting entity based on the configuration as received by the base station or based on a pre-configuration of the UE, for example for an out of coverage case.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 31 illustrates an example of a computer system 300. The units or modules as well as the steps of the methods performed by these units may execute on one or more computer systems 300.

The computer system 300 includes one or more processors 302, like a special purpose or a general purpose digital signal processor. The processor 302 is connected to a communication infrastructure 304, like a bus or a network. The computer system 300 includes a main memory 306, e.g., a random access memory (RAM), and a secondary memory 308, e.g., a hard disk drive and/or a removable storage drive. The secondary memory 308 may allow computer programs or other instructions to be loaded into the computer system 300. The computer system 300 may further include a communications interface 310 to allow software and data to be transferred between computer system 300 and external devices. The communication may be in the form electronic, electromagnetic, optical, or other signals capable of being handled by a communications interface. The communication may use a wire or a cable, fiber optics, a phone line, a cellular phone link, an RF link and other communications channels 312.

The terms "computer program medium" and "computer readable medium" are used to generally refer to tangible storage media such as removable storage units or a hard disk installed in a hard disk drive. These computer program products are means for providing software to the computer system 300. The computer programs, also referred to as computer control logic, are stored in main memory 306 and/or secondary memory 308. Computer programs may also be received via the communications interface 310. The computer program, when executed, enable the computer system 300 to implement the present invention. In particular, the computer program, when executed, enable processor 302 to implement the processes of the present invention, such as any of the methods described herein. Accordingly, such a computer program may represent a controller of the computer system 300. Where the disclosure is implemented using software, the software may be stored in a computer program product and loaded into computer system 300 using a removable storage drive, an interface, like communications interface 310.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A base station for a mobile communication network, the mobile communication network comprising a user equipment being served by the base station, the base station comprising:
   one or more antennas for receiving from and/or providing to the user equipment (UE) a data packet, and
   a signal processor,
   wherein, to receive the data packet from the user equipment (UE), the base station is configured to receive a plurality of different versions of the data packet transmitted by the user equipment (UE) to the base station in parallel via different physical resources, and/or
   wherein, to provide the data packet to the user equipment (UE), the base station is configured to provide a plurality of different versions of the data packet and to transmit the plurality of different versions of the data packet to the user equipment (UE) in parallel via different physical resources,
wherein the plurality of different versions of the data packet are acquired by performing a packet redundancy/duplication, and
wherein the base station is configured to send or receive for the plurality of different versions of the data packet
a single ACK/NACK message, or
only a NACK message,
wherein the single ACK/NACK message includes information about which physical resource provided an ACK and which physical resource provided a NACK.

2. The base station of claim 1, wherein the information included in the single ACK/NACK message provides for a dynamic adaption of a packet redundancy/duplication decision.

3. The base station of claim 2, wherein, after a number of successive NACKs, one or more non-reliable links are removed from the set of links to be used for transmitting the plurality of different versions of the data packet.

4. The base station of claim 1, wherein the single ACK/NACK message or the NACK message is encoded using a stronger coding when compared to ACK/NACK messages sent for every transmission.

5. The base station of claim 1, wherein the NACK message causes a reconfiguration of the packet redundancy/duplication to make the transmission reliable again.

6. The base station of claim 1, wherein the different physical resources comprise one or more of:
different frequency resources, or
different carriers (carrier aggregation), or
different physical links (dual connectivity), or
different resource pools for a direct communication.

7. The base station of claim 1, wherein transmitting the plurality of different versions of the data packet in parallel comprises transmitting the plurality of different versions of the data packet in a coordinated manner, and wherein transmitting the plurality of different versions of the data packet in a coordinated manner comprises one or more of:
transmitting the plurality of different versions of the data packet in a time coordinated manner, or
transmitting the plurality of different versions of the data packet together with control information identifying the plurality of different versions of the data packet.

8. The base station of claim 1, comprising a certain data radio bearer and/or a certain logic channel, and wherein the certain data radio bearer and/or the certain logic channel exhibits a static configuration causing that for each data packet the plurality of different versions is provided, or wherein the certain data radio bearer and/or the certain logic channel exhibits an adaptive configuration causing that providing the plurality of different versions of the data packet is switched on or off or deciding about a number and details of the physical resources to be used for providing the plurality of different versions of the data packet.

9. The base station of claim 1, wherein the base station is configured to transmit the plurality of different versions of the data packet via a plurality of transmission links, each using different physical resources, and to transmit, for each transmission link, a control signaling message (PDCCH) indicating the physical resources allocated to the plurality of different versions of the data packet.

10. The base station of claim 9, wherein the one or more control signaling messages, and the plurality of different versions of the data packet are part of one self-contained physical resource allocation.

11. The base station of claim 1, wherein the base station is configured to transmit a control signaling message to the user equipment indicating that the user equipment to operate in an autonomous mode, the control signaling message defining one or more conditions when the user equipment provides one version or the plurality of different versions of the uplink data packet and transmits the one version or the plurality of different versions of the uplink data packet to the radio access network or to another user equipment via different uplink physical resources, wherein the user equipment is configured to determine whether or not one or more of the conditions exist.

12. The base station of claim 11, wherein the one or more conditions comprise one or more of:
one or more predefined thresholds of user equipment measurements, or
an indication the UE receives from a higher layer protocol, or
a position of the user equipment within the cell, or
a distance form a serving base station, or
a speed at which the user equipment moves, or
a transmission power currently used by the user equipment, or
battery power of the user equipment.

13. The base station of claim 1, wherein data packet redundancy is provided for providing RRC diversity to make RRC control signaling faster and more reliable.

14. A method for transmitting a data packet in a mobile communication network, the mobile communication network comprising a base station serving a user equipment, the method comprising:
providing, by the base station, a plurality of different versions of the data packet, and
transmitting the plurality of different versions of the data packet to the user equipment in parallel via different physical resources,
wherein the plurality of different versions of the data packet are acquired by performing a packet redundancy/duplication, and
wherein the base station receives for the plurality of different versions of the data packet
a single ACK/NACK message, or
only a NACK message,
wherein the single ACK/NACK message includes information about which physical resource provided an ACK and which physical resource provided a NACK.

* * * * *